(12) United States Patent
Gehlhausen et al.

(10) Patent No.: US 11,125,390 B2
(45) Date of Patent: Sep. 21, 2021

(54) SHIPPING CONTAINER HAVING A FLAME RETARDANT LAYER AND A THERMAL BLOCKING LAYER

(71) Applicants: Carl Gehlhausen, Indianapolis, IN (US); Daniel Gehlhausen, Indianapolis, IN (US); Dennis Campbell, Indianapolis, IN (US); Von R Walters, Greenbrier, TN (US)

(72) Inventors: Carl Gehlhausen, Indianapolis, IN (US); Daniel Gehlhausen, Indianapolis, IN (US); Dennis Campbell, Indianapolis, IN (US); Von R Walters, Greenbrier, TN (US)

(*) Notice: Subject to any disclaimer, the term of this patent is extended or adjusted under 35 U.S.C. 154(b) by 0 days.

(21) Appl. No.: 15/731,933

(22) Filed: Aug. 25, 2017

(65) Prior Publication Data
US 2019/0137037 A1 May 9, 2019

Related U.S. Application Data

(63) Continuation-in-part of application No. 15/426,266, filed on Feb. 7, 2017, now Pat. No. 10,584,829, which
(Continued)

(51) Int. Cl.
*B65D 81/38* (2006.01)
*F17C 3/04* (2006.01)
(Continued)

(52) U.S. Cl.
CPC .................. *F17C 3/04* (2013.01); *B65D 7/06* (2013.01); *B65D 7/22* (2013.01); *B65D 43/22* (2013.01);
(Continued)

(58) Field of Classification Search
CPC ...... B65D 81/382; B65D 55/02; B65D 43/22; B65D 7/06; B65D 81/38; F17C 2201/01;
(Continued)

(56) References Cited

U.S. PATENT DOCUMENTS 4,059,753 A * 11/1977 Tart .......................... F21S 8/086
362/267
5,096,087 A * 3/1992 Thomas ................. B65D 90/501
137/312
(Continued)

FOREIGN PATENT DOCUMENTS

EP          3147598 A   *   3/2017

*Primary Examiner* — Stephen J Castellano
(74) *Attorney, Agent, or Firm* — Gordon E. Gray, III; Gray Law Firm

(57) ABSTRACT

The present invention relates to containers and packaging materials, and more particularly to a container having a thermal barrier member for reducing the transfer of heat from and/or to the container. The shipping container preferably comprises an outer vessel with an O-ring and an inner vessel separated by an air gap. The inner vessel has a first and second wall and a lid assembly. The lid assembly has a top lid and a bottom lid and a thermal paste. A felt gasket is preferably positioned between the lid assembly and the first and second walls. The first and second walls comprise at least two relief valves. One relief valve is a Flame Arresting/Smoke Particulate Filtration/Chemical Adsorption Unit Assembly and the valve is bi-directional. The thermal paste is preferably a flowable polymer based heat-absorbing material. The shipping container is stackable on a registration plate with other containers.

10 Claims, 20 Drawing Sheets

Related U.S. Application Data is a continuation of application No. 14/836,591, filed on Aug. 26, 2015, now Pat. No. 9,631,773.

(60) Provisional application No. 62/042,236, filed on Aug. 26, 2014.

(51) Int. Cl.
| | | |
|---|---|---|
| *H01M 50/24* | (2021.01) | |
| *B65D 6/02* | (2006.01) | |
| *B65D 6/10* | (2006.01) | |
| *B65D 43/22* | (2006.01) | |
| *B65D 55/02* | (2006.01) | |
| *F17C 13/00* | (2006.01) | |
| *F17C 13/12* | (2006.01) | |

(52) U.S. Cl.
CPC ............. *B65D 55/02* (2013.01); *B65D 81/38* (2013.01); *B65D 81/382* (2013.01); *F17C 13/004* (2013.01); *F17C 13/12* (2013.01); *H01M 50/24* (2021.01); *B65D 2585/88* (2013.01); *F17C 2201/01* (2013.01)

(58) Field of Classification Search
CPC .......... F17C 3/04; F17C 13/004; F17C 13/12; H01M 50/24; H01M 50/227
See application file for complete search history.

(56) References Cited

U.S. PATENT DOCUMENTS

| | | | | |
|---|---|---|---|---|
| 5,249,598 | A * | 10/1993 | Schmidt | B60K 15/03519 137/493.1 |
| 5,556,819 | A * | 9/1996 | Bar-Ilan | F24C 14/00 423/245.3 |
| 5,647,226 | A * | 7/1997 | Scaringe | C09K 5/066 62/371 |
| 2004/0240181 | A1* | 12/2004 | Chung | H01L 23/40 361/704 |
| 2005/0080182 | A1* | 4/2005 | Ahmed | C08J 3/03 524/458 |
| 2007/0054559 | A1* | 3/2007 | Thrap | H01G 2/02 439/620.01 |
| 2007/0186577 | A1* | 8/2007 | Goncharko | B65D 81/3858 62/371 |
| 2007/0277707 | A1* | 12/2007 | Robbins | B65D 5/445 108/53.1 |
| 2009/0154513 | A1* | 6/2009 | Shin | H05K 1/0206 372/36 |
| 2018/0283761 | A1* | 10/2018 | Buttiker | F25D 3/08 |
| 2019/0280259 | A1* | 9/2019 | Bruns | H01M 10/0525 |
| 2020/0403192 | A1* | 12/2020 | Huang | H01M 50/231 |
| 2021/0024275 | A1* | 1/2021 | Kennedy | B65D 7/22 |

* cited by examiner

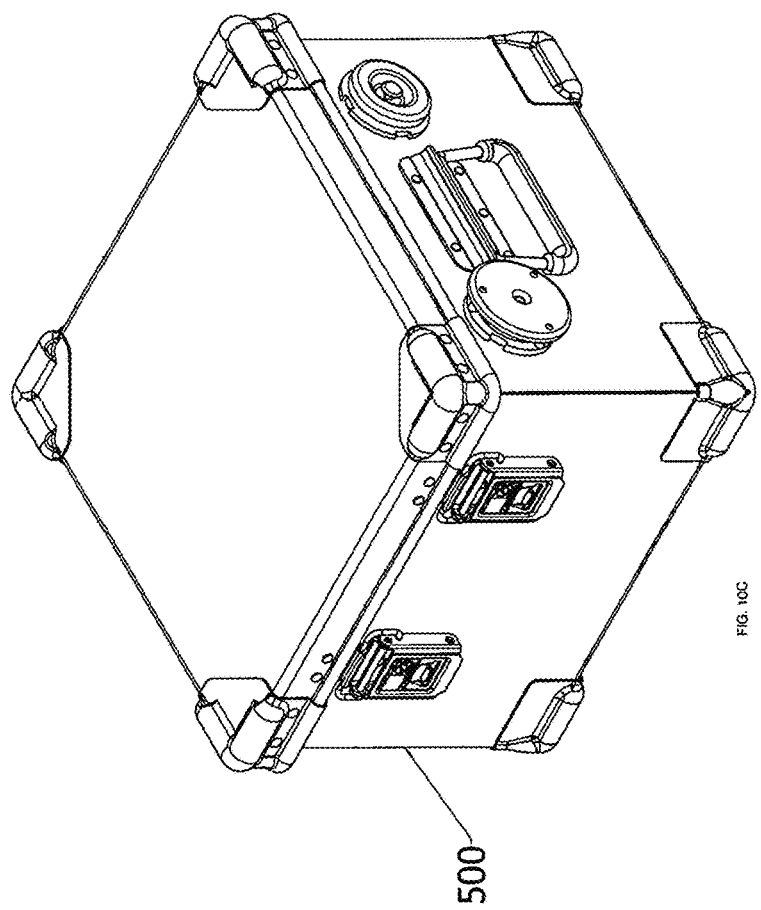
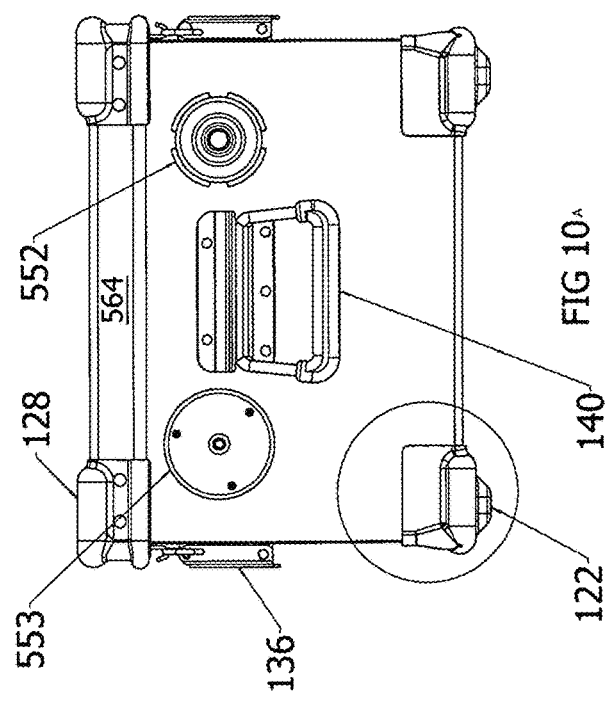

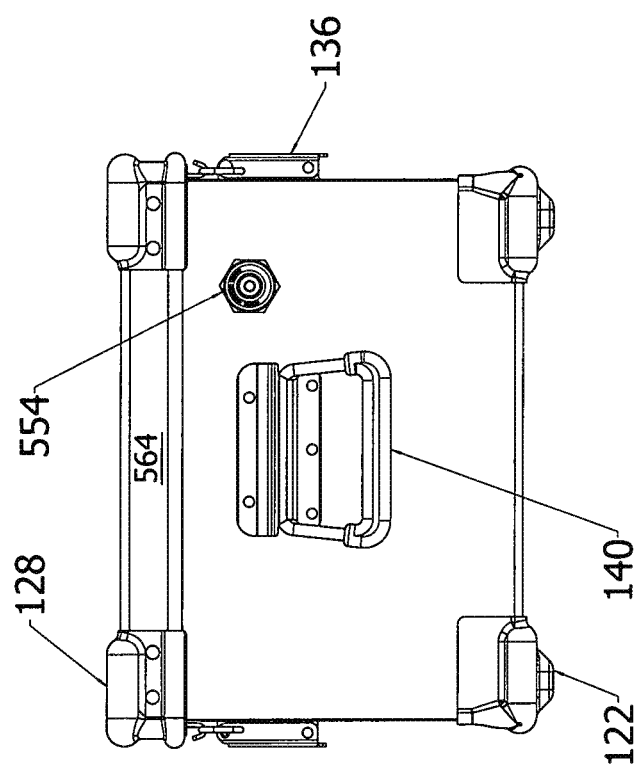

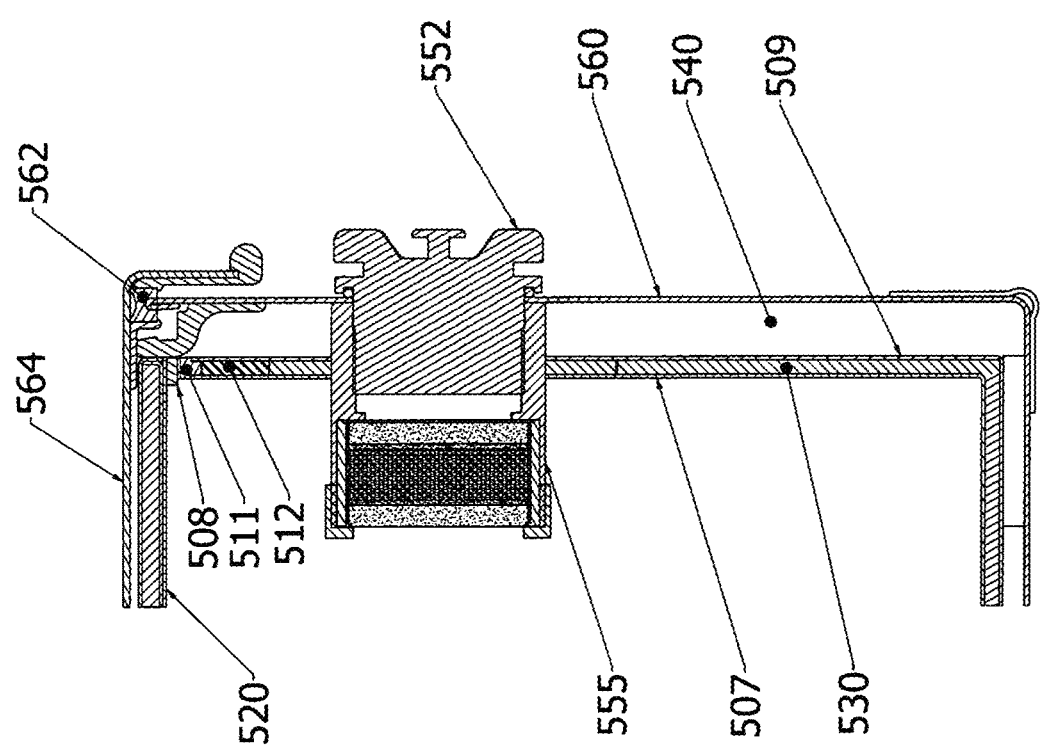

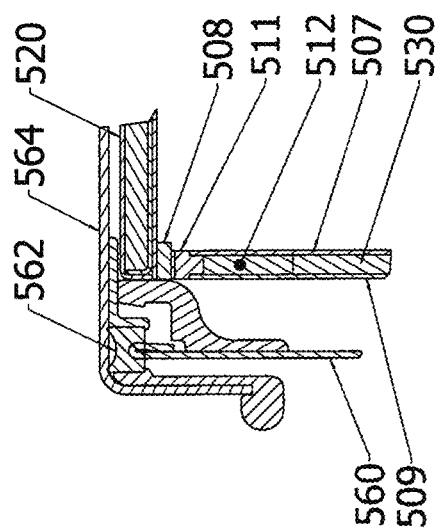
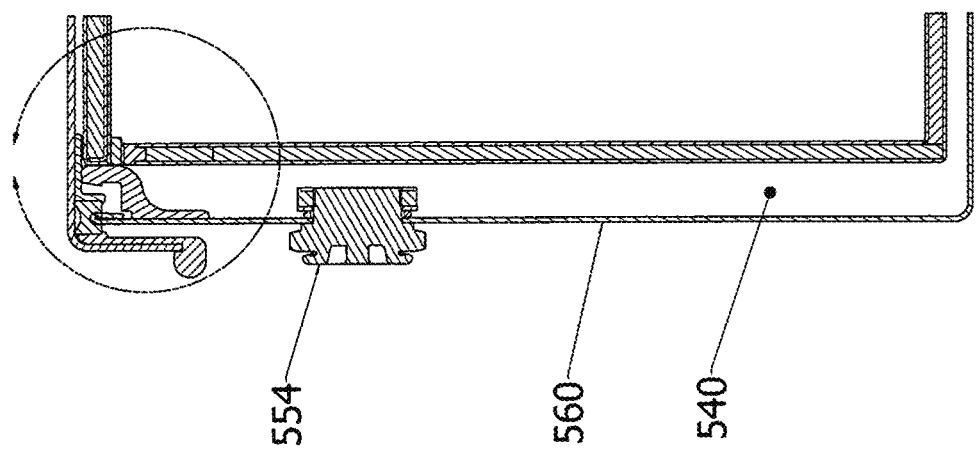
FIG 15B
FIG 15A

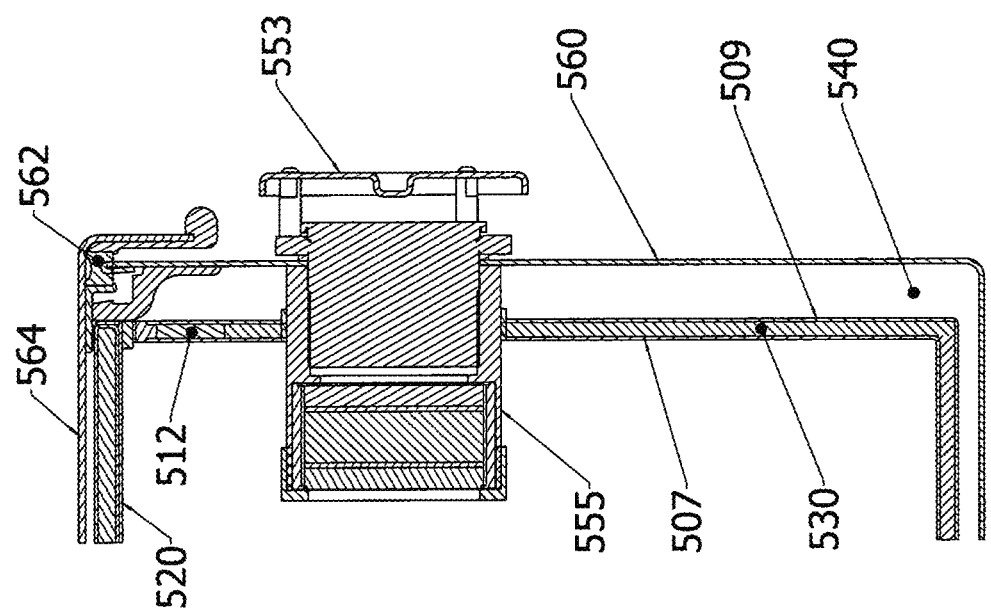

SHIPPING CONTAINER HAVING A FLAME RETARDANT LAYER AND A THERMAL BLOCKING LAYER

PRIORITY CLAIM

The instant application is a continuation in part application of U.S. Utility patent application Ser. No. 15/426,266, filed Feb. 7, 2017, now U.S. Pat. No. 10,584,829, which is a continuation of U.S. Utility patent application Ser. No. 14/836,591, filed Aug. 26, 2015, now U.S. Pat. No. 9,631,773, which claims the benefit of and priority to U.S. Provisional Patent Application Ser. No. 62/042,236, filed Aug. 26, 2014, and each of which are fully incorporated herein by reference.

I. TECHNICAL FIELD OF THE INVENTION

The present invention relates to containers and packaging materials, and more particularly to a container having a thermal barrier member for reducing the transfer of heat from and/or to the container.

II. BACKGROUND OF THE INVENTION

With the proliferation of electrically operated portable 1 gadgets," the number of batteries sold to power these gadgets has mushroomed proportionately. One type of battery whose sales have increased dramatically over the past 10 years is lithium batteries. For example, it is estimated that about 4 million dollars of lithium batteries were sold in 1996, and that about 4 billion dollars in lithium batteries were sold in 2014.

Lithium batteries have advantages over the alkaline batteries that they usually replace. Because since lithium is a very active material, it tends to provide greater power relative to the amount of material used in a battery. Additionally, the lithium discharge curve is longer and flatter than alkaline, thus providing consistent higher voltage to the life of the battery.

These characteristics enable a gadget manufacturer to reduce the size of batteries of equivalent power required to operate the gadget, or alternately to provide a greater amount of power in a battery in a determined size.

Although lithium batteries are more expensive than alkaline, they have especially good performance characteristics when used in small devices or those requiring a large amount of reserve power, such as cameras and smartphones.

The term "lithium battery" refers to a class of batteries that include cathodes or electrolytes that contain either metallic lithium or a lithium compound. The two primary categories of lithium batteries include lithium metal batteries and lithium-ion batteries.

There are several important differences between the lithium batteries and the lithium ion batteries. The most important practical difference between the two is that lithium batteries are not rechargeable, whereas lithium ion batteries are rechargeable. From a chemical standpoint, lithium batteries use lithium in its pure metallic form, whereas lithium ion batteries use lithium compounds that are much more stable than the elemental lithium used in lithium batteries. Although lithium batteries should never be recharged, lithium ion batteries are designed to be recharged hundreds of times.

Another advantage of lithium batteries as compared to other rechargeable such as nickel metal hydride rechargeable batteries or nickel cadmium batteries is that lithium batteries have a higher energy density than most types of other rechargeables. As such, for their size and weight, lithium ion batteries can store more energy than nickel based rechargeable batteries.

Additionally, lithium ion batteries operate at higher voltages than other rechargeable batteries, which enables single cell batteries to be used in many applications whereas a nickel metal hydride or nickel cadmium batteries would require multiple cells. Further lithium batteries have a lower self discharge rate than other types of rechargeable batteries, and therefore retain their charge for a longer period of time. In summary, lithium ion batteries can be made to be smaller, lighter, have a high voltage and hold a charge much longer than other types of rechargeable batteries.

Unfortunately, lithium batteries also have certain disadvantages when compared to other batteries. For example, lithium batteries can be more expensive to manufacture than alkaline and nickel based batteries. Another disadvantage of the use of lithium batteries is that they have a greater potential to catch fire than nickel based batteries.

It is believed that the root cause of the propensity of lithium ion batteries to catch fire is a failure or flaw in the separators within the batteries. Lithium batteries contain extremely thin separators that keep the elements in the battery apart. When these separators fail to function properly, the battery can fail and catch fire. These "bad separator" failures can result from poor design, manufacturing flaws, external damage induced on the battery, poor battery pack design, insufficient or inadequate protection being engineered into the design of the battery, and over charging.

The internal short circuit that results from damage to the thin separator results in the subsequent build up of heat. This build up of heat in a particular battery can trigger what is known as a thermal runaway in which the battery will overheat and bursts into flames, and thereby ignites adjacent batteries in much the same manner that a lit match within a pack of matches will ignite adjacent matches if the lit match gets close to the adjacent unlit matches.

In this regard, it has been recorded that lithium-ion batteries ignite at about 953 degrees F., and can reach temperatures that exceed 1100 degrees F. while burning. As such, a burning lithium ion battery can generally generate enough heat to cause adjacent batteries to also ignite. Depending on the type of battery and organic electrolyte composition and ratio, combustion can occur when the organic electrolyte reaches an auto ignition temperature ranging from 440° C. to 465° C. (824° F. to 869° F.) depending on the type of battery and organic electrolyte mixture composition and ratio.

This ability of batteries to ignite other batteries is referred to as a "thermal runaway". One factor that exacerbates thermal runaway is that lithium batteries are capable of burning and igniting without the presence of oxygen. As such, placing the batteries in an evacuated container, or a sealed container will not prevent the batteries within the container from engaging in a thermal runaway and thereby overheating the container.

Instances have been reported where a multi-battery container engaged in thermal runaway caused an adjacent multi-battery containing containers to get hot enough so as to ignite the lithium batteries contained within.

This propensity to catch fire can increase the risk to shippers who transport lithium batteries, especially when the batteries are shipped on board an aircraft. The increased risks of transporting the batteries increases the cost of transporting the batteries.

Transportation costs can contribute significantly to the cost of the batteries, especially in view of the fact that most batteries are sold today are manufactured in China, but may be used in distant markets, such as the North American and European markets.

A thermal runaway can create an especially problematic situation in an airplane that is carrying a load of batteries. Testing conducted by the FAA Wiliman J. Hughes Technical Center ("FAA Tech Center") indicates that there are particular propagation characteristics that are associated with the lithium batteries. The chain reaction thermal runaway can lead to self-heating and release of a battery's stored energy. In a fire situation, air temperature in a cargo compartment fire may rise above the auto ignition temperature of lithium. As discussed above these high temperatures can ignite and propagates ignition of adjacent batteries, and thereby create a risk of a catastrophic fire event in the cargo compartment.

Although improvements in lithium ion battery construction have made such thermal runaway extremely rare, the risk of a thermal runaway still exists.

Various attempts have been made to control thermal runaway. Most of these attempts have centered around the use of fire retardants or liquid suppression products technologies.

The underlying theory behind these attempts is to extinguish fire, and thereby reduce the effective number of burning batteries before the fires spread to adjacent batteries and/or adjacent containers and batteries, instead of preventing the first or thermal runaways from occurring. Unfortunately, these prior attempts have not been wholly successful in preventing thermal runaway with lithium batteries.

It will be appreciated that it would be useful to have a container that could limit the impact of such fires and explosions by providing a thermal barrier that reduces the heat transfer between adjacent containers, and thereby reduces the amount and size of the thermal runaway, and thereby reduce the heat and pressure generated in an area by the thermal runaway.

Superabsorbent polymers (SAPs) or hydrogels are loosely cross-linked, three-dimensional networks of flexible polymer chains that carry dissociated, ionic functional groups. They are basically the materials that can absorb fluids of greater than 15 times their own dried weight, either under load or without load, such as water, electrolyte solution, synthetic urine, brines, biological fluids such as urine sweat, and blood. They are polymers which are characterized by hydrophilicity containing carboxylic acid, carboxamide, hydroxyl, amine, imide groups and so on, insoluble in water, and are cross-linked polyelectrolytes. Because of their ionic nature and interconnected structure, they absorb large quantities of water and other aqueous solutions without dissolving by solvation of water molecules via hydrogen bonds, increasing the entropy of the network to make the SAPs swell tremendously.

The factors that supply absorbing power to polymers are osmotic pressure, based on movable counter-ions, and affinity between the polymer electrolyte and water. The factor that suppresses absorbing power, in contrast, is found in the elasticity of the gel resulting from its network structure. Not only are they of high fluid absorbing capacity, but the absorbed fluid is hard to release, as they merely immobilize the fluid by entrapment rather than by holding it in the structure. Process for their preparation are described, for example, in S. Kiatkamjornwong, "Superabsorbent Polymers and Superabsorbent Polymer Compositions, *Science Asia*, 33 Supplement 1 (2007): 39-43 and M. J. Zohuriaan-Mehr and K. Kabiri, "Superabsorbent Polymer Materials: A Review," Iranian *Polymer Journal,* 17(6), (2008), 451-477.

There are a number of US patents that address the use of particulate superabsorbent dry polymers for use in fire prevention and fire extinguishing, including: von Blucher U.S. Pat. No. 4,978,460; von Blucher U.S. Pat. No. 5,190,110; and Pascente U.S. Pat. No. 5,849,210.

III. SUMMARY OF THE INVENTION

A shipping container is configured for shipping thermally active materials. The shipping container comprises a plurality off structural panels defining a container interior and configured for receiving the thermally active materials. The container also includes an exterior disposed adjacent to an environment in which the shipping container is placed. The thermal barrier member is placeable between the thermally active materials and the environment in which the container is placed. The thermal barrier includes a thermal barrier interior panel and a third barrier exterior panel that define a heat absorbing material receiving cavity. A flowable polymer based heat absorbing material is disposed within the heat absorbing material receiving cavity. The thermal barrier is configured to substantially surround the thermally actively materials to reduce the passage of thermal energy between the thermally active materials and the environment in which the shipping container is disposed.

In a preferred embodiment, the shipping container can include a pressure relief member for permitting pressure generated by the thermally active materials to be vented to the exterior of the container.

In another preferred embodiment, a shipping container includes a partition member disposed within the heat absorbing material receiving cavity. The partition member defines a series of cells that are configured for receiving and holding the flowable polymer based heat absorbing material, so that the heat absorbing material is dispersed throughout the heat absorbing material receiving cavity.

In a most preferred embodiment, the thermally active materials comprise lithium batteries, and the thermal barrier is capable of maintaining an environment in which the shipping container is placed at less than about 950 degrees during a sustained burning of the batteries disposed within the container interiorly of the thermal barrier.

In one embodiment, the polymer-based heat absorbing material comprises a superabsorbent polymer.

In another embodiment, the polymer-based heat absorbing material consists essentially of a superabsorbent polymer.

In another embodiment, the polymer-based heat absorbing material consists of a superabsorbent polymer.

In another embodiment, the superabsorbent polymer is hydrated with water.

In another embodiment, the superabsorbent polymer is dry.

In another embodiment, the superabsorbent polymer is a homopolymer.

In another embodiment, the superabsorbent polymer is a copolymer.

In another embodiment, the superabsorbent polymer is cationic (a basic water-absorbing resin).

In another embodiment, the superabsorbent polymer is anionic (an acidic water-absorbing resin).

In another embodiment, the superabsorbent polymer is a polymer of hydrophilic monomers containing a carboxylic acid or acid, acid anhydride group, or sulfonic acid group.

In another embodiment, the superabsorbent polymer is a polymer of hydrophilic monomers containing a carboxylic acid or sulfonic acid ester, hydroxyl, amide, amine, nitrile, or quaternary ammonium salt group.

In another embodiment, the superabsorbent polymer is a polymer of hydrophilic monomers selected from the group consisting of: acrylamide, an acrylic acid derivative, maleic acid anhydride, itaconic acid, 2-hydroxyl ethyl acrylate, polyethylene glycol dimethacrylate, allyl methacrylate, tetraethyleneglycol dimethacrylate, triethyleneglycol dimethacrylate, diethylene glycol dimethacrylate, glycerol dimethacrylate, hydroxypropyl methacrylate, 2-hydroxyethyl methacrylate, 2-tert-butyl amino ethyl methacrylate, dimethylaminopropyl methacrylamide, 2-dimethylaminoethyl methacrylate, hydroxypropyl acrylate, trimethylolpropane trimethacrylate, and a 2-acrylamido-2 methylpropanesulfonic acid derivative.

In another embodiment, the superabsorbent polymer is a copolymer of acrylamide and an acrylic acid derivative.

In another embodiment, the superabsorbent polymer is a polyacrylate/polyacrylamide copolymer.

In another embodiment, the superabsorbent polymer is a polyacrylamide.

In another embodiment, the superabsorbent polymer is a polyacrylate.

In another embodiment, the superabsorbent polymer is a guar gum.

In another embodiment, the superabsorbent polymer is cross-linked.

In another embodiment, the superabsorbent polymer is cross-linked with an oil.

In another embodiment, the superabsorbent polymer is cross-linked with mineral oil.

In another embodiment, the superabsorbent polymer is formulated as an emulsion.

In another embodiment, the emulsion comprises water and an oil.

In another embodiment, the oil is mineral oil.

In another embodiment, the emulsion comprises water, oil, and superabsorbent polymer cross-linked with mineral oil.

In another embodiment, the superabsorbent polymer is formulated as a paste.

In another embodiment, the paste comprises oil and water.

In another embodiment, the oil is mineral oil.

In another embodiment, the paste comprises water, oil, and superabsorbent polymer cross-linked with mineral oil.

In another embodiment, the polymer-based heat absorbing material is NOCHAR's P215branmd heat absorbing material It will be appreciated that all allowable combinations of the above embodiments, together with other embodiments described elsewhere within this document, are contemplated as further embodiments of the invention.

IV. BRIEF DESCRIPTION OF THE DRAWINGS

FIG. 10A is a side view of another alternative embodiment container;

FIG. 10B is a side view of the alternative embodiment container in FIG. 10A;

FIG. 10C is a perspective front view of the alternative embodiment container in FIG. 10A;

FIG. 14 is a side cross-sectional view of the preferred alternative embodiment;

FIG. 15A is a side cross-sectional view of the preferred alternative embodiment;

FIG. 15B is a close-up side cross-sectional view of the preferred alternative embodiment;

FIG. 19 is a side cross-sectional view of the preferred alternative embodiment.

V. DESCRIPTION OF ILLUSTRATIVE EMBODIMENTS

Figure 1A:
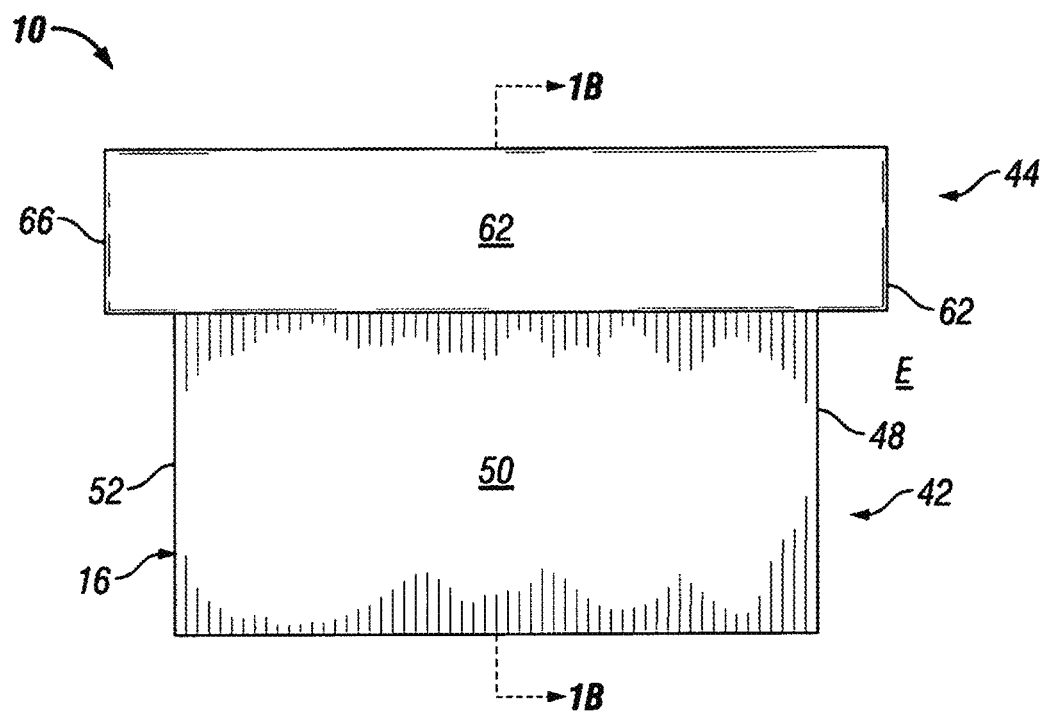
FIG. 1A is a side view of a shipping container of the present invention.
Figure 1B:
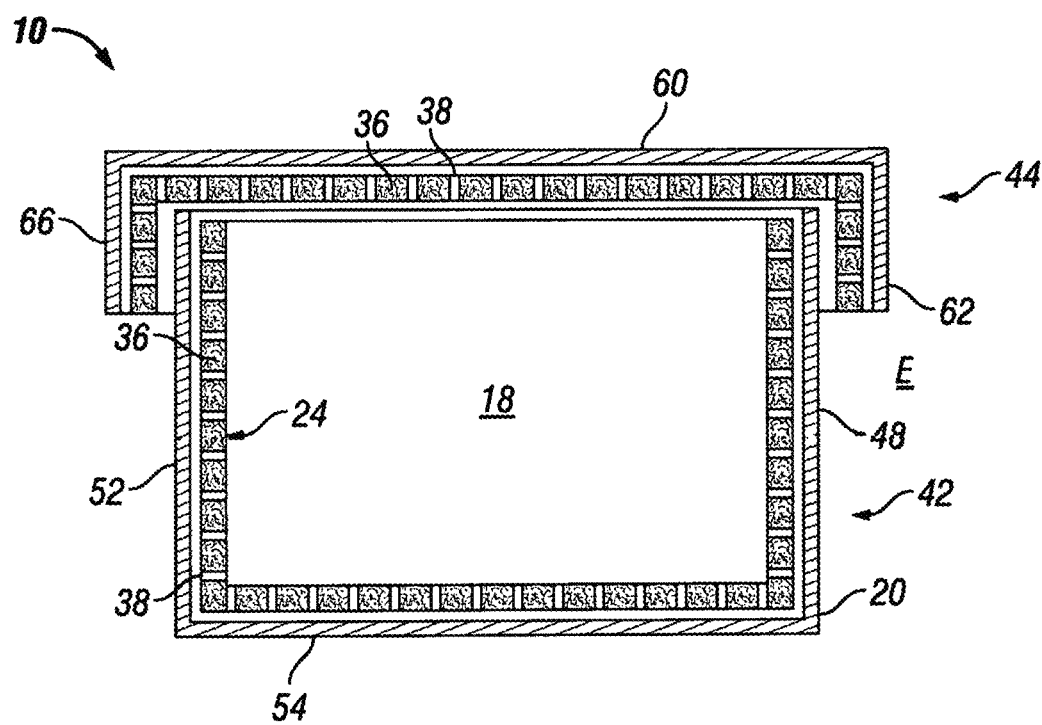
FIG. 1B is a sectional view taken along lines 1B-1B of FIG. 1A.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any such alterations and further modifications in the illustrated devices, and such further applications of the principles of the invention as illustrated herein are contemplated as would normally occur to one skilled in the art to which the invention relates.

As best shown in the figures, a shipping container 10 is configured for shipping thermally active materials, such as cases 12 of batteries 14. Although thermal activity can take a wide variety of both heating and cooling functionalities, the primary thermal activity materials for which the shipping container 10 of the present invention is designed, are thermally active materials such as batteries 14, and especially lithium and lithium ion batteries (collectively "lithium batteries" herein) that have a propensity (although rare) to combust, and engage in thermal runaways as discussed above. Burning lithium batteries combust at a temperature that is sufficient to cause other batteries to combust, including batteries in known adjacent shipping containers.

The shipping container 10 of the present invention is designed to provide a thermal barrier that will prevent thermally active materials, such as burning batteries, from generating enough heat in the environment E of the shipping container 10, to cause combustion of adjacent shipping containers 10, and the materials adjacent to the particular shipping container 10 in which the burning batteries are contained.

The shipping container 10 includes a plurality of structural panels 16 that define a container interior 18 that is configured for receiving the thermally active batteries 14.

The structural panels 16 also include an exterior, such as exterior surface 20 that is disposed adjacent to an environment E, in which the shipping container 10 is placed. Normally, the environment E will comprise the cargo hold of a transportation vehicle, such as a truck, airplane or ship. Alternately, the environment E could comprise an interior space of a larger container so that the shipping container 10 comprised a "container within a container", if such an arrangement were believed to be desirable.

A thermal barrier member 26 is provided for placement between the thermally active batteries 14 and the environment E to which the shipping container 10 is placed. The thermal barrier member 26 includes a thermal barrier interior panel 28, and a thermal barrier exterior panel 32. The thermal interior panel 28 and thermal exterior panel 32 define a heat absorbing material receiving cavity 34, into which a flowable polymer heat absorbing material 36 can be placed. The nature and composition of the flowable polymer heat absorbing material 36 will be described in more detail below.

Preferably, the polymer based heat absorbing material is a flowable paste material, that has a generally high viscosity, such as a paste. From a chemical standpoint, the flowable polymer should be the type of compound referred to as a "super absorbent" that is capable of absorbing and holding a large quantity of water in an emulsion.

The flowable, polymer based heat absorbing material 36 is disposed within the heat absorbing material cavity 34. The thermal barrier 26 is configured to substantially surround and encase the thermally active batteries 14, to reduce the passage of thermal energy between the interior 18 of the shipping container 10 in which the batteries 14 are placed, and the environment E in which the shipping container 10 is disposed.

The shipping container 10 includes a structural portion that includes a plurality of structural panels 16. In the illustrated embodiment, the shipping container 10 has a configuration that is generally rectangularly cuboid, and that is designed similarly to a box designed for holding a case of typewriter paper. In particular, the shipping container structural portion includes a base portion 42 and a lid portion 44. The base portion 42 includes four vertical side walls including first side wall 46, second side wall 48, third wall 50 and fourth side wall 52. A generally horizontally disposed bottom or base wall 54 has four edges, each of which is connected to one of the four side walls 46-52 respectively.

Each of the four side walls 46, 48, 50, 52 includes first and second side edges that are coupled to adjacent side walls, and a bottom edge that is connected to the base wall 54. Depending upon the particular construction of the base portion 42, the side walls 46-52 and base wall 54 can be unitarily formed, as they are in a cardboard box, or vacuum formed or stamped plastic container; or alternately, can comprise separable panels of chip board, lumber, metal plate or some other material that are joined along their respective side edges.

The lid member 44 is formed generally similarly to the base portion 44, except that it has a slightly longer width and length, and a slightly shorter side wall portion. The lid includes a horizontally disposed top panel or wall 58, having four edges. First 60, second 62, third (not shown) and fourth 66 side wall skirts each include an edge that is coupled to the side edge of the top panel 58. The side wall skirts 60-66 extend in a plane that is generally perpendicular to the plane of the horizontally disposed top wall 58, and extend downwardly a sufficient distance so that when the lid 44 is attached to the base 42, the lower ends of the skirt members 60-66 overlap the upper portions of the side wall portions 46-52 of the base member 42.

The thermal barrier member 24 includes a lid portion 70 that is formed separately from the primary body of the thermal barrier 24. The lid portion 70 is formed to be generally identical to the remainder of the thermal barrier 24, and is disposed along the interior surface of the side wall 60, 66 and horizontally disposed top wall 58 of the lid portion 44, so that when the lid 44 is engaged to the base 42, and combustible materials such as batteries 14 are placed within the interior battery receiving area 18 of the container 10, the combustible materials such as batteries 14 are completely surrounded and encased by a thermal barrier 24.

In a preferred embodiment, the lid 42 is sized so that a small gap exists between the four vertical wall skirts 58 (not shown), 64, 66 and the four side walls 46-52 of the base member 44. The small gap allows a certain amount of gas to exit or vent from the interior cavity 18 while still allowing the lid 44 to be secured to the base 42 and the side walls.

Preferably, some sort of latching mechanism is provided to help secure the lid 44 to the base 42. The latching mechanism can comprise anyone of a variety of latching mechanisms, from traditional latches or locks to strap members that surround the base 42 and lid 44, similar to the straps that are employed on writing paper cases.

In the case of a lithium battery fire, a pressure pulse may be given off when batteries explode within the interior 18. The gas and pressure created by this pressure pulse are preferably allowed to escape the container 10 in order to ensure that the container 10 is not compromised by the pressure pulse.

In one embodiment of the present invention, the base 42 and lid 44 are manufactured from a chip board. Chip board is an engineered wood product that is typically manufactured from wood chips, saw mill shavings or even sawdust and a synthetic resin or other suitable binder that is pressed and extruded. In one form, the binder is configured to absorb water molecules.

Figure 3:
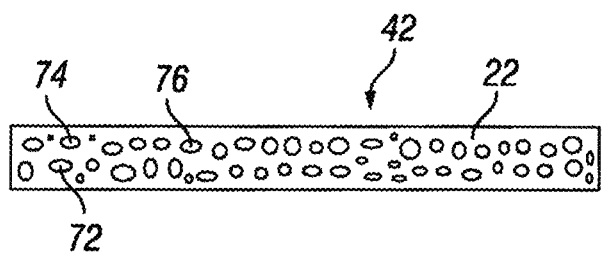
FIG. 3 is a schematic view that illustrates the molecular make up of an outer layer of the container.
Figure 4:
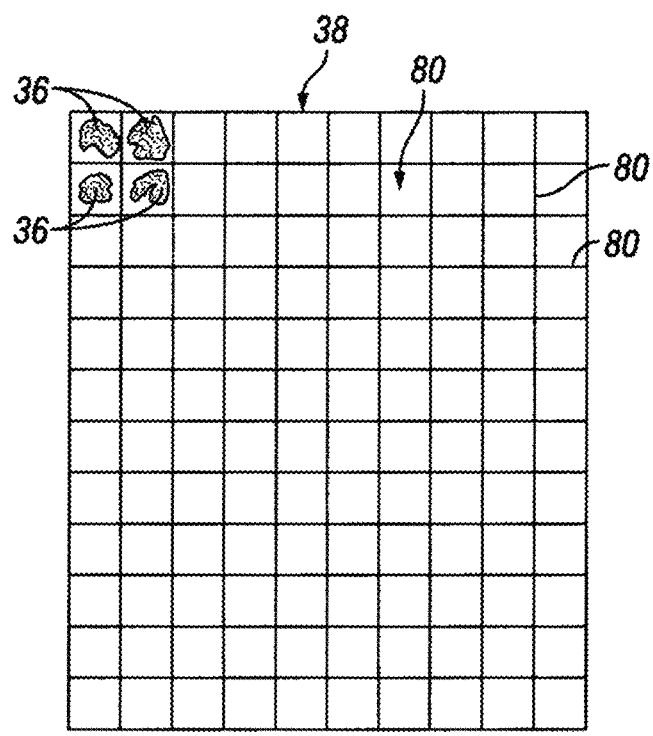
FIG. 4 is a schematic view of a partition member of the present invention, showing the heat absorbing material contained within some of the cells.
Figure 5:
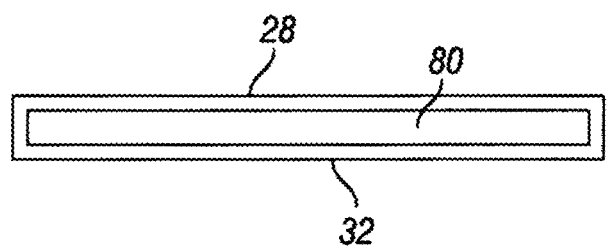
FIG. 5 is the schematic cross-sectional view of a panel of a container of one embodiment of the present invention.
Figure 6:
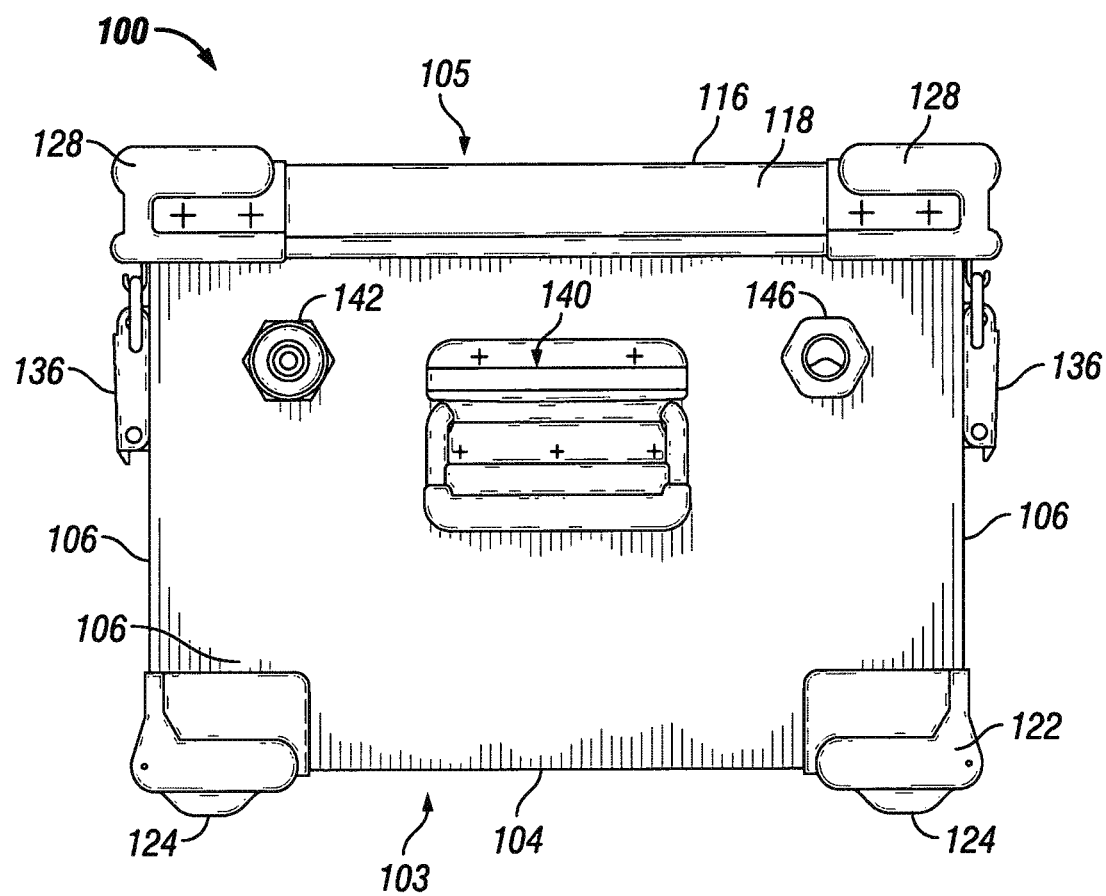
FIG. 6 is an end view of the first alternate embodiment shipping container of the present invention.
Figure 7:
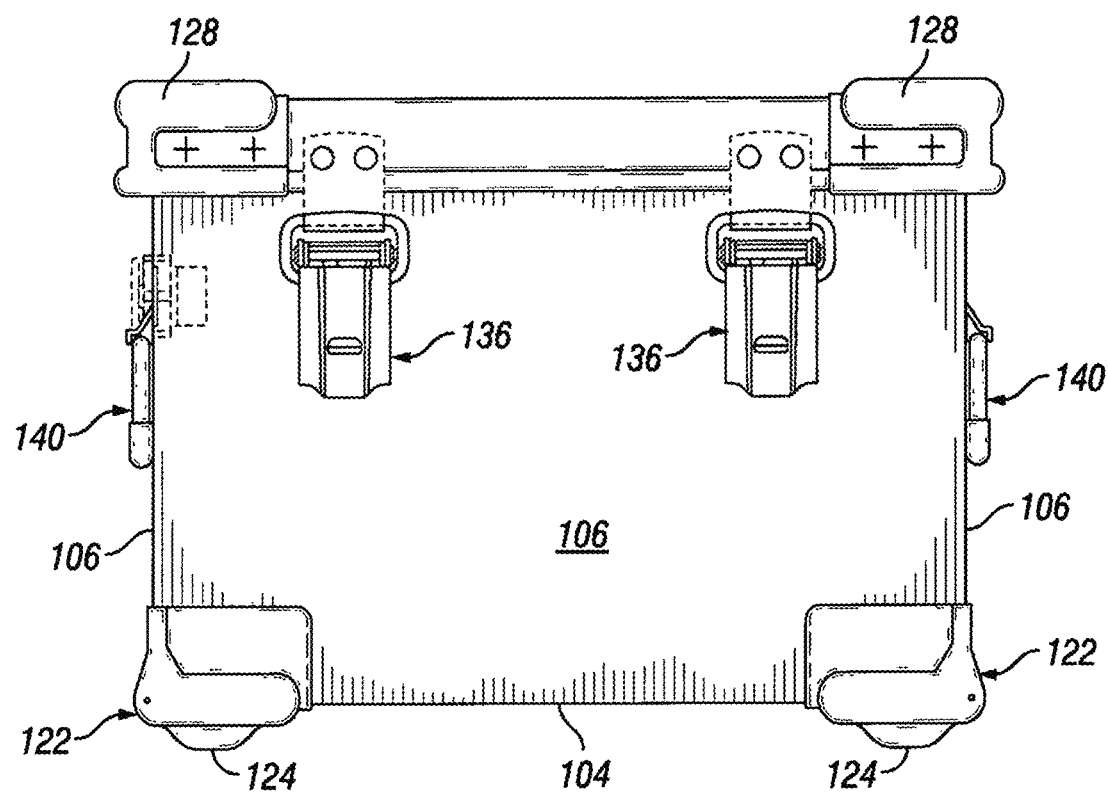
FIG. 7 is a front view of the alternate embodiment of the present invention shown in FIG. 6.

FIG. 3 illustrates a small segment of chip board of the type that can be used in the container 10 of the present invention. The chip board segment 22 is shown that includes a first retardant that is infused into the chip board. The fire retardant 76 preferably comprises a polymer based heat absorbing material, that is similar to the polymer based heat absorbing material that is used in the thermal barrier 24 and that is discussed in more detail below.

The first retardant heat absorbing polymer based material 76 is infused into the chip board 22, that includes a plurality of chip board molecules 74 that have been infused with the plurality of chip board molecules 72 that have been infused with a plurality of polymer based heat absorbing material molecules 74.

In the preferred form as described in more detail below, heat absorbing material is polymer based, is non-toxic, and is a non-hazardous polymer heat absorbing material that is designed for unsealed natural fiber materials and products, such as the chip board 22. The preferred fire retardant 76 is described in more detail below, and can be purchased by NOCHAR, Inc., under the trademark NOCHAR's fire preventer ("NFP"). NFP may be applied to the chip board 22 by spray, curtain coating, thermal dip, vacuum chamber, roller coating or soaking.

NFP is a water soluable product that uses water as a carrier to penetrate the chip board 22. The water is then dried or driven off leaving the actual heat absorbing material 76 in place within the chip board 22.

As will be described in more detail below also, the NFP increases the first safety of materials and products treated by increasing the temperature and amount of kilicalories of input heat required for ignition, reducing the rate of heat release after ignition, and slowing the rate of the flame spread.

The NFP purchased by NOCHAR, Inc., can be added to bonding agents, adhesives and sealants.

The thermal barrier member 24 of the present invention is shown in the figure as including a base portion 27, that lines the base 42 of the container 10, and a lid portion 29 that lines the lid.

Alternately, the thermal barrier 24 can comprise a unitary, sack-like member that is placed in the container, that includes a cavity 18 therein into which the cartons 40 of heat combustible materials 14 can be placed.

Importantly, the thermal barrier 24 should be designed so that it encloses or encases the combustible materials such as batteries 14. Additionally, in the embodiment shown in FIGS. 1A-D and 2A-C, the thermal barrier 24 should include a pressure relief member, that may comprise a traditional pressure relief valve or a gap as described above so that built up pressure caused by combustion or other thermal activity can be vented from the interior 18 of the container to the exterior of the container.

The shipping container 10 includes a thermal barrier inner interior panel 28 that is coupled to a thermal barrier outer panel 32, to form a heat absorbing material receiving cavity 34. The thermal barrier exterior panel and interior panel 28, 32 should be made from a fire resistant material capable of absorbing or withstanding high temperatures without being compromised or melting. Additionally, the material from which the interior 28 and 32 panels is made should be designed to be non-combustible, and sturdy enough to securely hold the heat absorbing thermal barrier material contained within the cavity 34 without ripping, tearing or the like.

An example of a material that would work well in this situation is a thin aluminum sheet material.

When designing materials for the shipping container 10, and the thermal barrier 24, one seeks a balance of qualities and characteristics. As shipping costs are often calculated as a function of weight, one would like to choose the lightest weight materials possible, so as to save on shipping costs. On the other hand, it is important to have a shipping container that is sturdy enough so as to withstand the rough treatment that shipping containers often receive during transit. Preferably, the shipping container can be sturdy enough so that it could be reused on multiple occasions.

As discussed in more detail below, a preferred thermal barrier material comprises a paste in consistency. As a paste is a flowable material, the materials from which the external panels 28, 32 are made, should be sturdy enough so that it will not be breached easily, as a breach may cause the flowable heat absorbing material to leak out of the interior receiving cavity 34 of the thermal barrier. As such, a thin foil, while weight saving, may not be sturdy enough to easily prevent such breaches. Therefore, a thickened foil or sheeting of a metal material such as aluminum is likely to be more preferred than the use of foil.

Figure 2A:
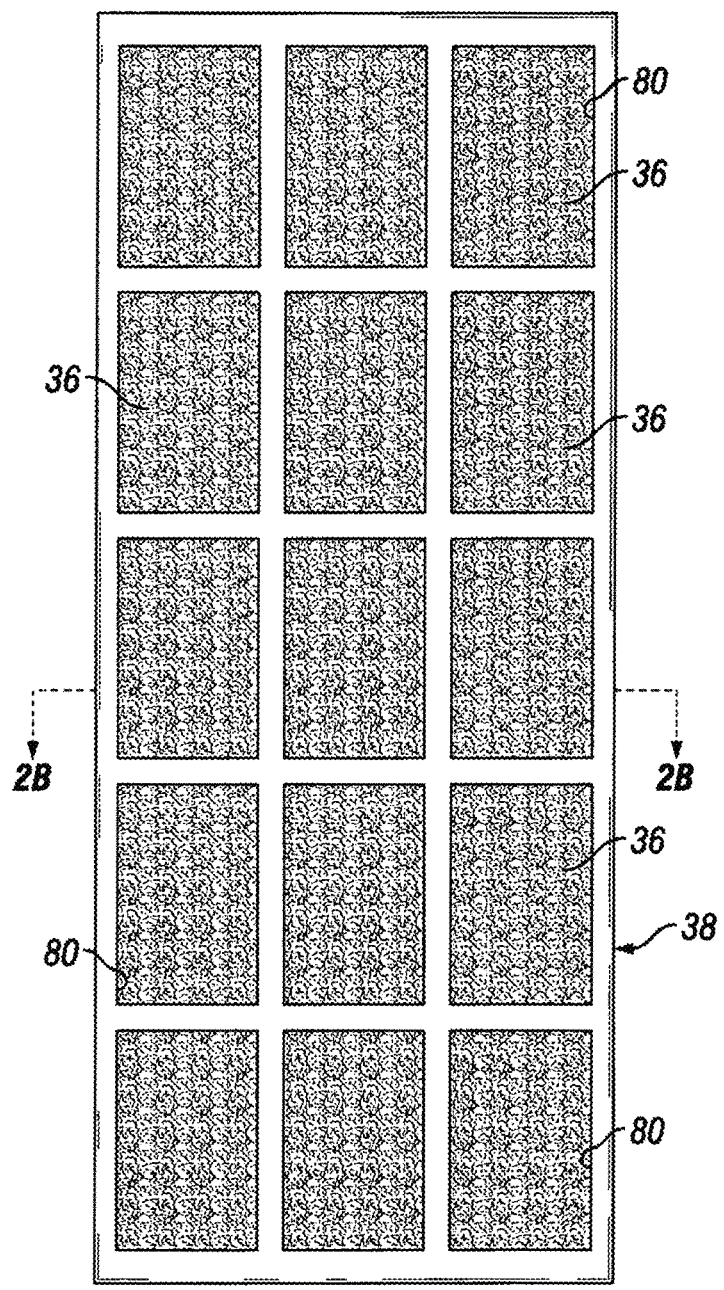
FIG. 2A is a top view of the partition member that includes a plurality of cells in which a heat absorbing material of the present invention is received.
Figure 2B:
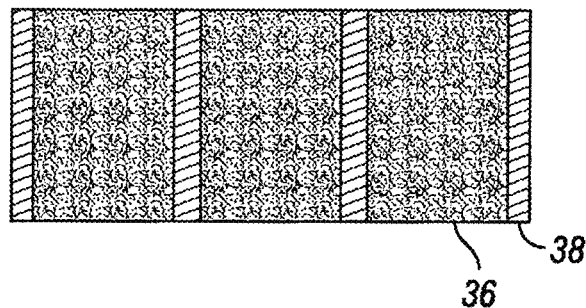
FIG. 2B is a sectional view taken along lines 2B-2B of FIG. 2A.
Figure 2C:
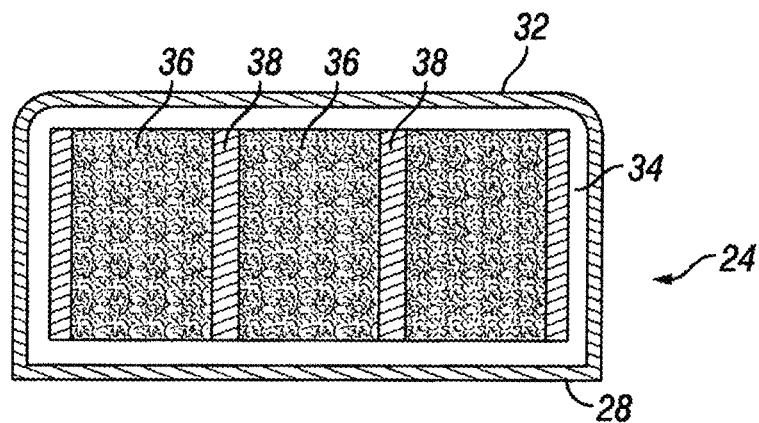
FIG. 2C is a sectional view, generally similar to FIG. 2B of the thermal barrier, wherein the inner and outer panel members are joined together to form a heat receiving material cavity wherein the partition member and heat absorbing material are contained.

A partition member 38 is placed within the interior heat absorbing material receiving cavity 34 of a thermal barrier. The partition member, as shown in FIG. 2A, comprises a lattice work member of a generally rigid material, such as metal or plastic that includes a series of apertures or cells 80 having hollow interiors into which the heat absorbing flowable polymer 36 can be placed. The purpose of the partition member 38 is to better disperse the heat absorbing polymer 36 contained within the cells over the entire surface area of the thermal barrier. As will be appreciated, the flowable nature of the thermal barrier material would likely result in the heat absorbing polymer based material aggregating and collecting under the influence of gravity, in the lower portions of the cavity 34. By employing the partition member 38, the paste like heat absorbing material will be retained and dispersed over the entire area of the thermal barrier.

Figure 1C:
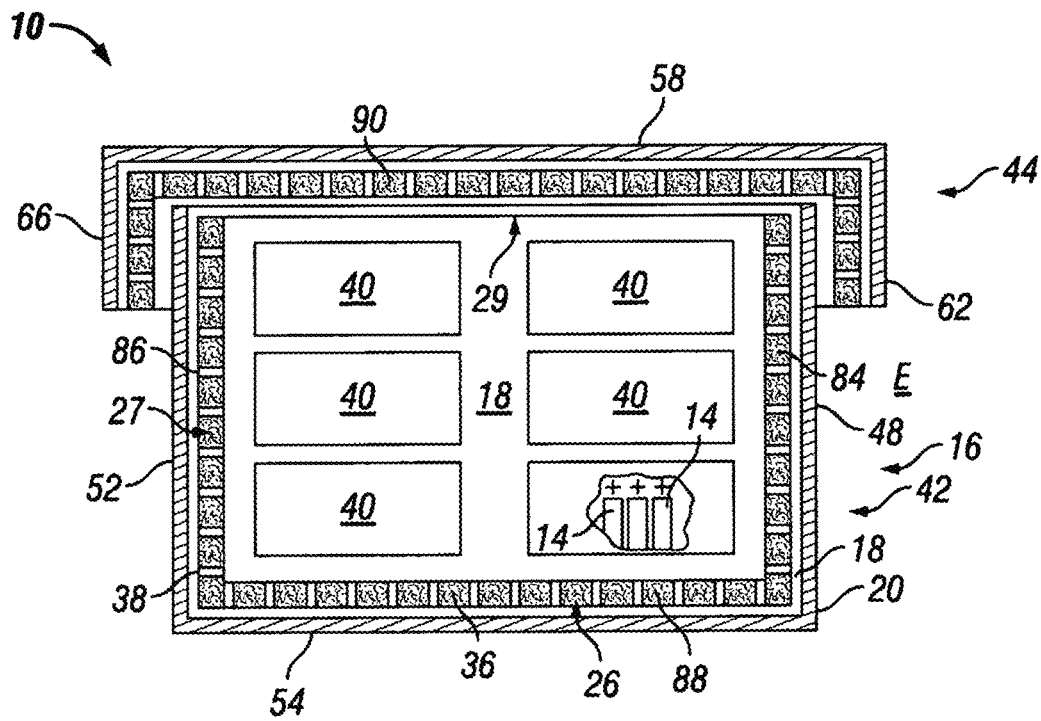
FIG. 1C is a sectional view, similar to FIG. 1B except that cartons of batteries are shown in the interior of the container.
Figure 1D:
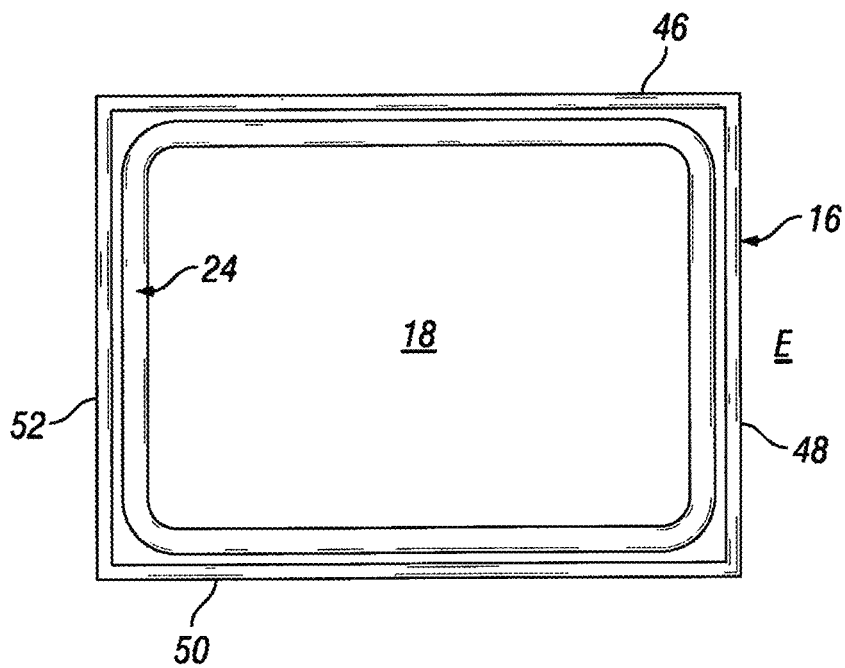
FIG. 1D is a top view of the shipping container illustrated in FIG. 1A.

As shown in FIG. 1C, a plurality of thermal barrier segments can be used, such as thermal barrier segment 84 and 88 that are disposed adjacent to the side walls 48, 52 of the structural member 16, and thermal barrier panel 88 that is disposed adjacent to the base panel 54 of the structural member 16. Additionally, a base panel segment 90 can be provided that is positioned adjacent to the underside interior surface of the top panel 58.

A primary factor that influences the shape of the various thermal barrier segments 84-90 is the rigidity (or lack thereof) of the partition member 38. For example, if one were to use a generally rigid planarly configured partition member 38, it is likely that the barrier panel 24 itself will take on a planar or mat like configuration. However, if one were to use a more flexible or formed partition member 38, one could construct a thermal barrier 24 of any shape into which one could bend, mold or otherwise configure the partition member 38.

To create the top panel thermal barrier member 90, one could take a generally planar partition member 38 that was sized and configured to have a size and shape generally similar to the size and shape of top panel 58. To this generally planarly disposed partition member 38, one could then affix skirt partition members to the primary partition member at 90 degrees thereto, so that the skirt partition members could be disposed adjacent to the skirts 62, 66 of the lid member 58.

The various cells within the partition member 38 could then be filled with the flowable heat absorbing material.

In operation, the flowable heat absorbing paste helps to resist the propagation of fire to adjacent containers, by absorbing the heat generated by a fire within the interior 18 of the container 10. As such, even though the temperature within the container may be above the 953 degree threshold combustion temperature of a lithium battery, the temperature exteriorly of the container 10 will be significantly less than 950 degrees.

Within the interior 18 of the container, the intense heat generated by the burning batteries, that burn well above 1100 degrees will likely ignite adjacent batteries within the interior 18 of the container 10. As such, a fire in a single battery may lead to a thermal runaway that causes other batteries within the interior 18 of container 10 to also catch on fire. This fire will give off heat and pressure, especially when a battery explodes. As discussed above, the pressure will be vented by a gap through which gas can pass that is formed in the construction of the container, or else by a traditional pressure release valve that allows gas to pass if the pressure within the interior space exceeds a pre-determined threshold.

Notwithstanding the high heat generated within the interior 18 of the container 100, the exterior environment E of the container 10 will not rise above the predetermined threshold combustion value of batteries in adjacent containers, due to the heat absorbing material being able to absorb the heat generated by the burning batteries 14 within the shipping container 10. As such, this thermal blocking by the heat absorbing material 36 serves to effectively contain the fire and excessive heat within the interior 18 of the container 10, and prevents the exterior environment E of the container from getting too hot.

In a preferred embodiment of the present invention, the device 10 can be designed so that the heat absorbing material is sufficient in it heat absorbing and thermal blocking capacity so as to ensure that the exterior atmosphere of the container does not rise above the 953 degree combustion threshold point of lithium batteries in adjacent containers, when lithium batteries within the interior 18 of the container catch fire.

Although the cell 80 in FIG. 2A is shown as being generated rectangular in configuration, it will be appreciated that the cells 80 can take on a variety of shapes, depending upon how the cells are formed in the partition member.

It is important that the thermal barrier covering materials 28, 32 are made from the fire resistant material, for if they caught fire, the heat generated by the fire of the barrier panels 28, 30, could cause temperatures exteriorly of the environment E of the container 10 to also rise appreciably. Additionally, if the thermal barrier panels 28, 30 caught on fire, the heat from the fire so created could be enough to cause the container structural panels 16 to catch on fire, thus allowing heat to come in close proximity to adjacent containers. Arguably, this heat could be sufficiently intense so as to cause nearby containers to catch on fire, thus igniting nearby batteries therein causing further thermal runaways.

During initial testing of the container 10, unexpected results were obtained as it relates to the ability of the container 10 to contain a fire. It has been reported that lithium-ion batteries ignite at about 953° F. and can reach temperatures that exceed 1100° F. while burning. During tests of the container 10 disclosed herein, fires exceeding 1400° F. have been introduced into the internal cavity 18 and the container 10 was sealed for 20 minutes, 40 minutes, and 60 minutes while the fires were left to burn themselves out. In particular, road flares, which do not require oxygen to burn, were introduced into the internal cavity 18.

After the tests were conducted, while there were burn marks on the fire resistant layers of material 28, 32 the thermal barrier 24 was capable of prohibiting burning of the outer panel members 16 of the container 10. As such, all of the flames from the fire were contained within the interior cavity of the container 10. Thus, the container 10 disclosed herein is capable of prohibiting lithium-ion battery fires ignited within the internal cavity 14 from spreading beyond the container 10 thereby increasing the safety of shipping lithium-ion batteries.

An alternate embodiment shipping container 100 is shown in FIGS. 6-9. Shipping container 100 has a configuration that is somewhat reminiscent of a steamer trunk, or shipping container of the type used by bands who perform on the road to house their amplifiers, drums and other musical instruments during transportation. Preferably, the shipping container 100 includes a plurality of structural panels that are made from a light but strong fire resistant metal material such as aluminum or titanium. Alternately, the panels can be made from a fire resistant plastic.

Although the container 100 can be made of any size, in one most preferred embodiment the container has a square cross section about a horizontal plane and a rectangular cross section about a vertical plane such that the width and length of the container (without metal feet or top members) as approximately 390 centimeters, and the height is approximately 265 centimeters.

The alternate embodiment container 100 includes a base member 103 that is removably coupled to a lid 105. The lid 105 is removable from the base member 103 so that both the thermal barrier (not shown) and the cargo such as the batteries 14 can be placed within the hollow interior (not shown) of the container 100.

Figure 9:
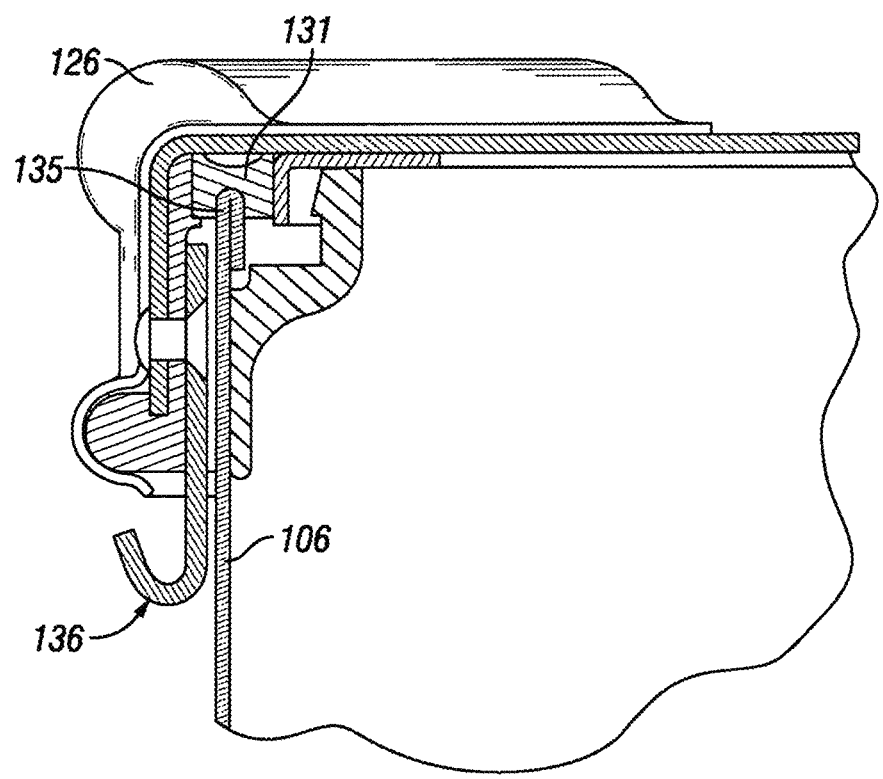
FIG. 9 is a sectional view taken along the upper left-hand corner of FIG. 7.

As the container 100 is rectangularly cuboid, it includes four side panels 106 of generally equal size, along with a base panel 103, that is generally square in configuration. The lid 105 includes a top panel 116 and four skirt panels 118 that are disposed in a generally perpendicular relation to the top panel 116 and extend downwardly therefrom. A lip member may be formed on the edge of the skirt panel member to engage the upper edge of the base member side wall 106. As shown in FIG. 9, the skirt panel members overlap the upper portion of the side panel, and an engagement seal 131 is provided for sealingly engaging the reinforced top edge 135 of the side panel member 106.

Reinforced bottom corner members 122 are placed at the intersection of the bottom panel 104 and the side panels 106. The reinforced corner members 122 also include lower depending feet 124 that help to provide a stable engagement with the rest surface such as a floor or lower container for the particular container 100.

Figure 8:
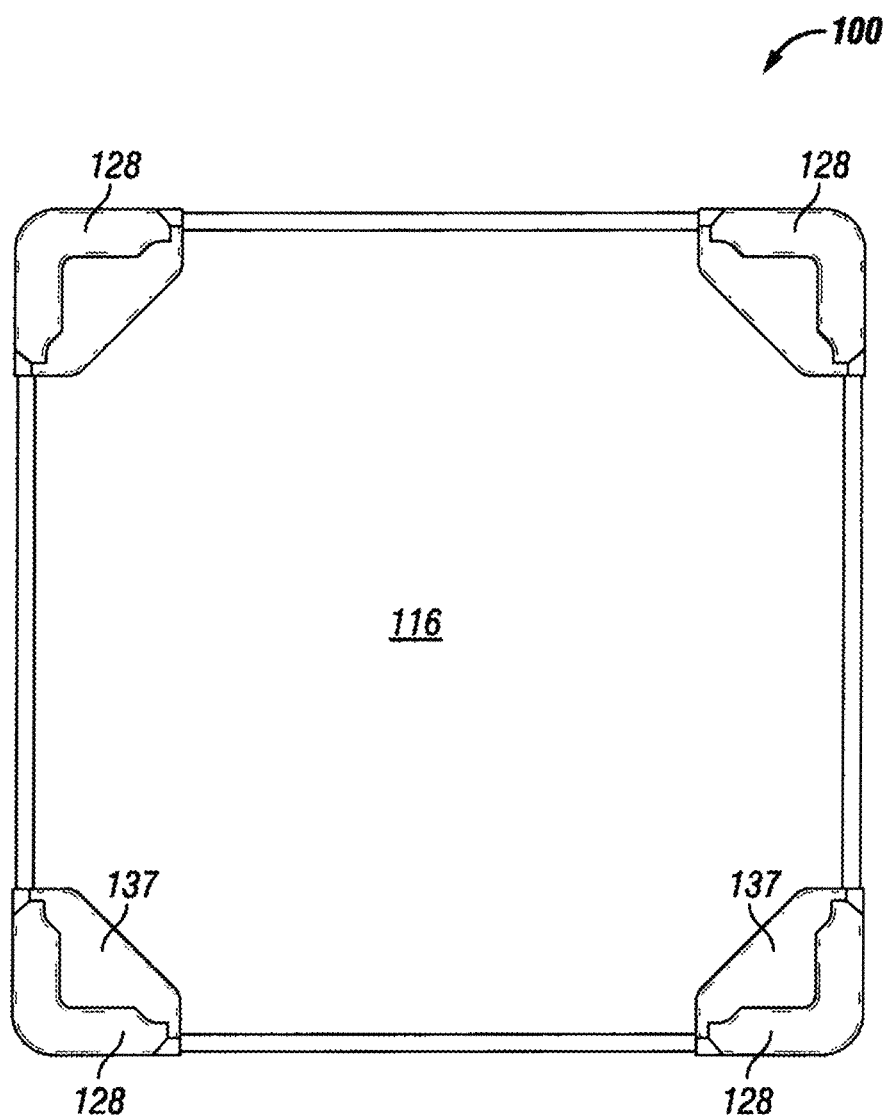
FIG. 8 is a top view of the alternate embodiment container shown in FIG. 6.

Additionally, reinforced corner members 128 are attached to the lid at the corners where the top panel 116 meets the skirt members 118. Preferably, as is shown in FIG. 8, the top corner panel members include a receiving area that is designed to receive the feet 124 of a container placed on top of the particular container to help lock the upper container onto the lid of the lower container so that it is able to resist movement.

A plurality of latch members 136 (here shown as four) are coupled to the front and back side panel members and include a hook and loop latch mechanism for engaging the lid 105 to the base 104 in a manner wherein the lid and base will stay connected and resist separating apart. The latch members 136 can be designed to be lockable if so desired.

First and second handles, 140, are placed on the side panel members, and include a handle for making it easier to lift and carry the container 100. A pressure relief valve 142 is provided that includes a gas passageway that extends between the interior cavity of the container 100 and the environment E in which the container is disposed to prevent an over pressure situation within the interior of the container 100 of the type that might cause the container 100 to explode. By venting pressure, such an explosion can be avoided. Additionally, a humidity indicator 145 is also provided on the container 100.

In operation, the container 100 operates generally similarly to the container 10 shown in the other figures. Although not shown in the drawings, a thermal barrier, similar to the thermal barrier 24 as shown in connection with FIG. 1A, can be disposed within the interior of an alternate embodiment container 100.

Presented below is a description of the flowable polymer based heat absorbing material that is used in the thermal barrier 24 described above.

Polymer-Based Heat Absorbing Material

The polymer-based heat absorbing material of the present invention comprises a superabsorbent polymer (SAP). SAPs are water-absorbent materials that are capable of absorbing between about 40 and about 400 times their weight in water. Superabsorbent polymers are produced by adding to a reaction mixture of linear polymers a cross-linking agent which forms two- and/or three-dimensional bonds between the linear molecules. The effect of this cross-linking is to immobilize the linear molecules. Their affinity for water is not reduced, but now water must be absorbed within the cross-linked structure. The polymer itself does virtually nothing to prevent or extinguish combustion, but rather insulates and immobilizes entrapped water that would otherwise either evaporate or run off the combustion surface, in either case becoming ineffective in preventing a fire.

In one embodiment, the SAP is formulated as a liquid emulsion, preferably an oil and water emulsion, more preferably a water and mineral oil emulsion. While such emulsions are desirable because they keep the components uniform, they can eventually separate into hydrophobic and hydrophilic layers given enough time without agitation. It is, therefore, advantageous to convert the emulsion to a water-containing paste, which is not susceptible to phase separation, using high shear with additional water. It is further desirable to irradiate the emulsion to induce cross-linking of the SAP with the mineral oil. By varying the parameters of these processes, both viscosity and molecular weight of the resulting material can be customized. An example of such a preferred material is NOCHAR's P215™. In this embodiment, it will be appreciated that the material can include other cross-linking agents in addition to the mineral oil.

The resultant water-containing paste is then used to insulate the box described herein. In the event of an internal Li-battery fire, the paste functions to effectively and efficiently extract heat out of the system due to the high heat capacity of the water in the paste. The result is that the fire is contained within the box and extinguished. In a cargo situation, this ensures that the fire does not spread to adjacent cargo and, ultimately, to the transit vehicle itself.

Examples of superabsorbent polymers include cross-linked polyacrylates and their derivatives, such as polyacrylamide and polyacrylate salts (i.e. sodium polyacrylate or potassium polyacrylate), polyacrylate/polyacrylamide copolymers, and starch-grafted polymers. Polyacrylate salts such as sodium polyacrylate or potassium polyacrylate can absorb up to about 500 times their weight in water, or more. However, because, they are salts, their absorption capacity is greatly dependent on the impurities in the water. For example, "hard water," or water with a relatively high concentration of calcium or magnesium ions, lowers the absorption capacity of potassium polyacrylate because the ions disrupt bonding between the polymer and water. Polyacrylamide is not as affected by hard water, but does not have as high an absorption capacity as the polyacrylate salts. Polyacrylamide is known to be able to absorb between about 20 times and about 400 times its weight in water. However, even at absorption capacities as low as 100 times its weight in water, polyacrylamide can still absorb enough water to be an effective fire-retardant.

In other embodiments, the superabsorbent polymer is a polymer of hydrophilic monomers, such as acrylamide, acrylic acid derivatives, maleic acid anhydride, itaconic acid, 2-hydroxyl ethyl acrylate, polyethylene glycol dimethacrylate, allyl methacrylate, tetraethyleneglycol dimethacrylate, triethyleneglycol dimethacrylate, diethylene glycol dimethacrylate, glycerol dimethacrylate, hydroxypropyl methacrylate, 2-hydroxyethyl methacrylate, 2-tert-butyl amino ethyl methacrylate, dimethylaminopropyl methacrylamide, 2-dimethylaminoethyl methacrylate, hydroxypropyl acrylate, trimethylolpropane trimethacrylate, or 2-acrylamido-2 methylpropanesulfonic acid derivatives, as disclosed in US patent publication no. 2009/0069496 A1 (p. 2 paras 18-19). The superabsorbent polymer can also be a co-polymer of acrylamide and acrylic acid derivatives or a terpolymer of an acrylate salt, acrylamide, and a 2-acrylamido-2-methylpropanesulfonic acid (AMPS) salt. The salts may generally be any monovalent salt, such as sodium, potassium, or ammonium salts.

Berg et al., U.S. Pat. No. 5,397,626, also describes suitable superabsorbent polymers (see column 6, line 47 to column 8, line 53). As disclosed by Berg et al., SAPs include cross-linked polymers prepared from polymerizable, unsaturated, acid-containing monomers, including olefinically unsaturated acids and anhydrides that contain at least one carbon to carbon olefinic double bond. More specifically, these monomers include olefinically unsaturated carboxylic acids and acid anhydrides, olefinically unsaturated sulfonic acids, and mixtures thereof.

Some non-acid monomers may also be used to prepare the precursor particles herein. Such non-acid monomers can include, for example, the water-soluble or water-dispersible esters of the acid-containing monomers as well as monomers which contain no carboxyl or sulfonic acid groups at all. Optional non-acid monomers can thus include monomers containing the following types of functional groups: carboxylic acid or sulfonic acid esters, hydroxyl groups, amide-groups, amino groups, nitrile groups and quaternary ammonium salt groups. These non-acid monomers are well known materials and are described in greater detail, for example, in U.S. Pat. No. 4,076,663 and in U.S. Pat. No. 4,062,817.

Olefinically unsaturated carboxylic acid and carboxylic acid anhydride monomers include the acrylic acids typified by acrylic acid itself, methacrylic acid, ethacrylic acid, alpha-chloroacrylic acid, alpha-cyano acrylic acid, beta-methyl acrylic acid (crotonic acid), alpha-phenyl acrylic acid, beta-acryloxy propionic acid, sorbic acid, alpha-chloro sorbic acid, angelic acid, cinnamic acid, p-chloro cinnamic acid, beta-steryl acrylic acid, itaconic acid, citraconic acid, mesaconic acid, glutaconic acid, aconitic acid, maleic acid, fumaric acid, tricarboxyethylene and maleic acid anhydride.

Some superabsorbent polymer materials for use in the present invention include a carboxyl group. Examples of these polymers include hydrolyzed starch-acrylonitrile graft copolymers, partially neutralized starch-acrylonitrile graft copolymers, starch-acrylic acid graft copolymers, partially neutralized starch-acrylic acid graft copolymers, saponified vinyl acetate-acrylic ester copolymers, hydrolyzed acrylonitrile or acrylamide copolymers, partially crosslinked products of any of the foregoing copolymers, partially or completely neutralized polyacrylic acid, and partially crosslinked products of partially neutralized polyacrylic acid. These polymers may be used independently or in the form of copolymers formed from a mixture of two or more of such monomers.

Some superabsorbent polymer materials are crosslinked products of partially neutralized polyacrylic acids and starch derivatives therefrom. For example, the solid SAP particles can comprise from about 50% to about 95%, or about 75% neutralized crosslinked polyacrylic acid, e.g., poly (sodium acrylate/acrylic acid).

The polymer materials are crosslinked to an extent such that the polymer is water-insoluble. The crosslinking serves to render the polymers substantially water-insoluble and in part serves to determine the absorptive capacity of the polymers. Suitable cross-linking agents are known in the art and include the di- or poly-functional molecules capable of cross-linking polyacrylic acid and/or metal salts of polyacrylic acid by reaction with the acrylic or acrylate functional groups of the polymer. Such cross-linking agents include diglycidyl ethers, dialcohols, and diamines. In general, the cross-linking agent should be water-soluble and possess reactivity with the polymer such that cross-linking occurs in a controlled fashion in the temperature range of about 50° C. to about 150° C. Suitable cross-lining agents include ethylene glycol, polyethylene glycols, polypropylene glycols, and diglycidyl ethers of (poly) ethylene glycols. One such agent is ethylene glycol diglycidyl ether (EGDGE), a water-soluble diglycidyl ether. Additional cross-linking agents are disclosed in EPO 450 923 A2 (Nippon Shokubai Kagaku Kogyo Co.).

Erdner et al., U.S. Pat. No. 7,670,515, also describes suitable superabsorbent polymers (col. 4, line 8 to col 8, line 61). As disclosed by Erdmer et al., SAPs are generally lightly crosslinked hydrophilic polymers as discussed in U.S. Pat. Nos. 5,669,894 and 5,559,335. SAPs can differ in their chemical identity, but all SAPs are capable of absorbing and retaining amounts of aqueous fluids equivalent to many times their own weight, even under moderate pressure. For example, SAPs can absorb one hundred times their own weight, or more, of distilled water.

SAPs are available in a variety of chemical forms, including substituted and unsubstituted natural and synthetic polymers, such as hydrolysis products of starch acrylonitrile graft polymers, carboxymethylcellulose, crosslinked polyacrylates, crosslinked and partially neutralized copolymers of isobutylene and maleic anhydride, saponification products of vinyl acetate-acrylic acid copolymer, sulfonated polystyrenes, hydrolyzed polyacrylamides, polyvinyl alcohols, polyethylene oxides, polyvinylpyrrolidones, and polyacrylonitriles.

An SAP typically is neutralized at least about 25 mole percent, preferably at least about 50 mole percent, and usually about 70 to 80 mole percent, to achieve optimum absorbency. Neutralization can be achieved by neutralizing the acrylic acid monomer before polymerization of the monomer, or the polymer can be neutralized after the polymerization reaction is substantially complete. After polymerization and internal crosslinking of the monomer, followed by partial neutralization, e.g., 50-100 mole percent neutralization, preferably 70 to 80 mole percent neutralization, the polymer is subdivided, e.g., shredded or chopped, for more efficient drying, then dried and milled to a desired particle size. The polymer can then be surface crosslinked and again dried to form the final product.

The SAP can be an acidic water-absorbing resin or a basic water-absorbing resin. Monomers useful in the preparation of an SAP are disclosed in U.S. Pat. No. 5,149,750 and WO 01/68156, each incorporated herein by reference. In some embodiment, the SAP comprises an acidic or a basic water-absorbing resin neutralized about 25% to about 100%, i.e., has a degree of neutralization (DN) of about 25 to about 100.

The SAP can be anionic (an acidic water-absorbing resin) or cationic (a basic water-absorbing rein) in nature. The anionic SAPs are based on an acidic water-absorbing resin. The anionic SAPs, either strongly acidic or weakly acidic, can be any resin that acts as an SAP in its neutralized form. The acidic resins typically contain a plurality of carboxylic acid, sulfonic acid, phosphonic acid, phosphoric acid, and/or sulfuric acid moieties.

In some embodiment, the SAP is an acidic water-absorbing resin neutralized 25% to 100%. The acidic water-absorbing resin can be a single resin or a mixture of resins. The acidic resin can be a homopolymer or a copolymer. The identity of the acidic water-absorbing resin is not limited as long as the resin is capable of swelling and absorbing at least ten times its weight in water, when in a neutralized form.

The acidic water-absorbing resin typically is a lightly crosslinked acrylic resin, such as lightly crosslinked poly (acrylic acid). The lightly crosslinked acidic resin typically is prepared by polymerizing an acidic monomer containing an acyl moiety, e.g., acrylic acid, or a moiety capable of providing an acid group, i.e., acrylonitrile, in the presence of an internal crosslinking monomer, i.e., a polyfunctional organic compound. The acidic resin can contain other copolymerizable units, i.e., other monoethylenically unsaturated comonomers, well known in the art, as long as the polymer is substantially, i.e., at least 10%, at least 25%, at least 50%, at least 75%, or up to 100%, acidic monomer units.

Ethylenically unsaturated carboxylic acid and carboxylic acid anhydride monomers useful in the acidic water-absorbing resin include acrylic acid, methacrylic acid, ethacrylic acid, α-chloroacrylic acid, α-cyanoacrylic acid, β-methylacrylic acid (crotonic acid), α-phenylacrylic acid, β-acryloxy-propionic acid, sorbic acid, α-chlorosorbic acid, angelic acid, cinnamic acid, p-chlorocinnamic acid, β-stearylacrylic acid, itaconic acid, citraconic acid, mesaconic acid, glutaconic acid, aconitic acid, maleic acid, furmaric acid, tricarboxyethylene, and maleic anhydride. Acrylic acid is one ethylenically unsaturated carboxylic acid for preparing the SAP.

Ethylenically unsaturated sulfonic acid monomers include aliphatic and aromatic vinyl sulfonic acids, such as vinyl sulfonic acid, allyl sulfonic acid, vinyl toluene sulfonic acid, styrene sulfonic acid, acrylic and methacrylic sulfonic acids, such as sulfoethyl acrylate, sulfoethyl methacrylate, sulfopropyl acrylate, sulfopropyl methacrylate, 2-hydroxy-3-methacryloxypropyl sulfonic acid, and 2-acrylamido-2-methylpropane sulfonic acid. Phosphate-containing acidic resins are prepared by homopolymerizing or copolymerizing ethylenically unsaturated monomers containing a phosphoric acid moiety, such as methacryloxy ethyl phosphate. An extensive list of suitable SAP-forming monomers can be found in U.S. Pat. No. 4,076,663.

The anionic SAPs can be, for example, a poly(acrylic acid), a hydrolyzed starch-acrylonitrile graft copolymer, a starch-acrylic acid graft copolymer, a saponified vinyl acetate-acrylic ester copolymer, a hydrolyzed acrylonitrile copolymer, a hydrolyzed acrylamide copolymer, an ethylene-maleic anhydride copolymer, an isobutylene-maleic anhydride copolymer, a poly(vinylsulfonic acid), a poly(vinyl-phosphonic acid), a poly(vinylphosphoric acid), a poly(vinylsulfuric acid), a sulfonated polystyrene, and mixtures thereof. One anionic SAP is a poly(acrylic acid).

The polymerization of acidic monomers, and copolymerizable monomers, if present, most commonly is performed by free radical processes in the presence of a polyfunctional internal crosslinking monomer. The acidic resins are crosslinked to a sufficient extent such that the polymer is water insoluble. Crosslinking renders the acidic resins substantially water insoluble, and, in part, serves to determine the absorption capacity of the resins. For use in absorption applications, an acidic resin is lightly crosslinked, i.e., has a crosslinking density of less than about 20%, less than about 10%, or about 0.01% to about 7%. An internal crosslinking monomer can be used in an amount of less than about 7 wt %, and typically about 0.1 wt % to about 5 wt %, based on the total weight of monomers.

Examples of internal crosslinking monomers include, but are not limited to, polyacrylic (or polymethacrylic) acid esters represented by the following formula (I),

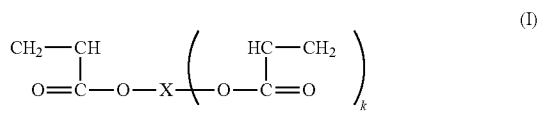

wherein x is ethylene, propylene, trimethylene, cyclohexyl, hexamethylene, 2-hydroxypropylene, —(CH$_2$CH$_2$O)$_n$CH$_2$CH$_2$— or

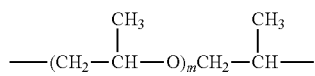

wherein n and m, independently, are an integer 5 to 40, and k is 1 or 2; and bisacrylamides, represented by the following formula (II), CH$_2$H—C(=O)—NH(CH$_2$CH$_2$NH)$_l$C(=O)— CH=CH$_2$ (II)

wherein l is 2 or 3.

The compounds of formula (I) are prepared by reacting polyols, such as ethylene glycol, propylene glycol, trimethylolpropane, 1,6-hexanediol, glycerin, pentaerythritol, polyethylene glycol, or polypropylene glycol, with acrylic acid or meth-acrylic acid. The compounds of formula (II) are obtained by reacting polyalkylene polyamines, such as diethylenetriamine and triethylenetetramine, with acrylic acid. Specific crosslinking monomers are disclosed in U.S. Pat. No. 6,222,091. Examples of crosslinking agents are pentaerythritol triallyl ether, pentaerythritol triacrylate, N,N'-methylenebisacrylamide, N,N'-methylenebismethacrylamide, ethylene glycol dimethacrylate, and trimethylolpropane triacrylate.

Analogous to the acidic resin, a basic water-absorbing resin, i.e., cationic SAP, useful in the present SAP-clay particles can be a strong or weak basic water-absorbing resin. The basic water-absorbing resin can be a single resin or a mixture of resins. The basic resin can be a homopolymer or a copolymer. The identity of the basic resin is not limited as long as the basic resin is capable of swelling and absorbing at least 10 times its weight in water, when in a charged form. The weak basic resin can be present in its cationic form, i.e., about 25% to 100% of the basic moieties, e.g., amino groups, are present in a charged form. The strong basic resins typically are present in the hydroxide (OH) or bicarbonate (HCO$_3$) form.

The basic water-absorbing resin typically is a lightly crosslinked resin, such as a poly(vinylamine) or a poly(dialkylaminoalkyl (meth)acrylamide). The basic resin also can be, for example, a lightly crosslinked polyethylenimine, a poly(allylamine), a poly(allylguanidine), a poly(dimethyldiallylammonium hydroxide), a quaternized polystyrene derivative, a guanidine-modified polystyrene, a quaternized poly((meth)acrylamide) or ester analog. See U.S. Pat. No. 6,235,965. The lightly crosslinked basic water-absorbing resin can contain other copolymerizable units and is crosslinked using an internal crosslinking monomer, as set forth above with respect to the acidic water-absorbing resin. Examples of basic resins include a poly(vinylamine), polyethylenimine, poly(vinylguanidine), poly(dimethylaminoethyl acrylamide) (poly(DAEA)), and poly(dimethylaminopropyl methacrylamide) (poly-(DMAPMA)).

A basic water-absorbing resin used in the present SAP typically contains an amino or a guanidino group. Accordingly, a water-soluble basic resin also can be crosslinked in solution by suspending or dissolving an uncrosslinked basic resin in an aqueous or alcoholic medium, then adding a di- or polyfunctional compound capable of crosslinking the basic resin by reaction with the amino groups of the basic resin. Such crosslinking agents are disclosed in U.S. Pat. No. 6,235,965. Crosslinking agents also are disclosed in U.S. Pat. No. 5,085,787, and in EP 450 923. Examples of crosslinking agents are ethylene glycol diglycidyl ether (EGDGE), a water-soluble diglycidyl ether, and a dibromoalkane, an alcohol-soluble compound.

Copolymerizable monomers for introduction into the acidic resin or the basic resin, include, but are not limited to, ethylene, propylene, isobutylene, C$_{1-4}$alkyl acrylates and methacrylates, vinyl acetate, methyl vinyl ether, and styrenic compounds having the formula:

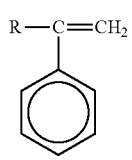

wherein R represents hydrogen or a C$_{1-6}$alkyl group, and wherein the phenyl ring optionally is substituted with one to four C$_{1-4}$alkyl or hydroxy groups.

Suitable C$_{1-4}$alkyl acrylates include, but are not limited to, methyl acrylate, ethyl acrylate, isopropyl acrylate, n-propyl acrylate, n-butyl acrylate, and the like, and mixtures thereof. Suitable C$_{1-4}$alkyl methacrylates include, but are not limited to, methyl methacrylate, ethyl methacrylate, isopropyl methacrylate, n-propyl methacrylate, n-butyl methacrylate, and the like, and mixtures thereof or with C$_{1-4}$alkyl acrylates. Suitable styrenic compounds include, but are not limited to, styrene, α-methylstyrene, p-methylstyrene, t-butyl styrene, and the like, and mixtures thereof or with C$_{1-4}$alkyl acrylates and/or methacrylates.

Any polymerization initiator known for use in preparing SAPs can be used. Examples of useful initiators are redox and thermal initiators, such as those disclosed in U.S. Pat. No. 6,359,049. The redox and thermal initiators can be used singly or in suitable combination. Specific initiators are a redox initiator comprising ammonium persulfate and sodium hydrogen sulfite, and azo initiators, such as azobisisobutyronitrile and 2,2'-azobis(2-amidinopropane)dihydrochloride, commercially available under the tradename V-50 from Wako Chemicals U.S.A., Inc., Richmond, Va. The initiator typically is used in an amount, calculated as solids, of about 0.1% to about 10%, based on the weight of the acrylic acid monomer, or about 0.5% to about 5%, based on the weight of the monomer. Depending on the amount and kind of the initiator, the initiator optionally can be used together with isopropyl alcohol, an alkyl mercaptan, or other chain transfer agent to control the molecular weight of the poly(acrylic acid).

Ultraviolet (UV) light also can be used to effect polymerization of acrylic acid. UV light can be used in conjunction with a redox initiator and/or a free radical initiator. When UV light is utilized in the polymerization step, a photoinitiator also is added to the reaction mixture in an amount well known to persons skilled in the art. Suitable photoinitiators include, but are not limited to, 2-hydroxy-1-[4-(hydroxyethoxy)phenyl]-2-methyl-1-propanone, which is commercially available from Ciba Additives of Hawthorne, N.Y., as IRGACURE 2959, and 2-hydroxy-2-methyl-1-phenyl-1-propanone, which also is commercially available from Ciba Additives as DAROCUR 1173.

Industrial processes useful for preparing the SAP component include all processes customarily used to synthesize SAPs, as described, for example, in Chapter 3 of "Modern Superabsorbent Polymer Technology," F. L. Buchholz and A. T. Graham, Wiley-VCH (1998). A suitable process for polymerizing the acrylic acid is aqueous solution polymerization, wherein an aqueous solution containing acrylic acid and polymerization initiator is subjected to a polymerization reaction and a crosslinking reaction by the addition of an internal crosslinking monomer, such as methylenebisacrylamide.

Although various embodiments have been described as having particular features and/or combinations of components, other embodiments are possible having a combination of any features and/or components from any of embodiments as discussed above. As used in this specification, the singular forms "a," "an" and "the" include plural referents unless the context clearly dictates otherwise.

While the invention has been illustrated and described in detail in the drawings and foregoing description, the same is to be considered as illustrative and not restrictive in character, it being understood that all changes and modifications that come within the spirit of the invention are desired to be protected.

Alternative Embodiment

An alternative embodiment of the present invention preferably controls heat produced by a thermal runaway event, e.g. from lithium ion batteries and cells densely packed within the inner cavity of the present invention shipping container 500 to slow the heat from flowing beyond the outside walls of the container 500. The alternative embodiment described below also preferably controls heat, pressure and hazardous gases produced by a thermal event in a cargo hold outside of the shipping container 500 and slows it from flowing into an inner cavity of the shipping container 500.

Referring now to FIG. 10, the shipping container 500 is preferably configured in one of three distinct size cubes (small, medium or large) which can be grouped into a unitized package configuration, e.g. a 1,200 mm×1,200 mm×1,200 mm cube, for inter modal transportation by air, sea, rail or truck. The three different sizes of the shipping container can be interlocked into a unitized package configuration and are preferably fitted with a technology suite to allow for the safe shipment of Lithium Ion batteries or cells.

Figure 16:
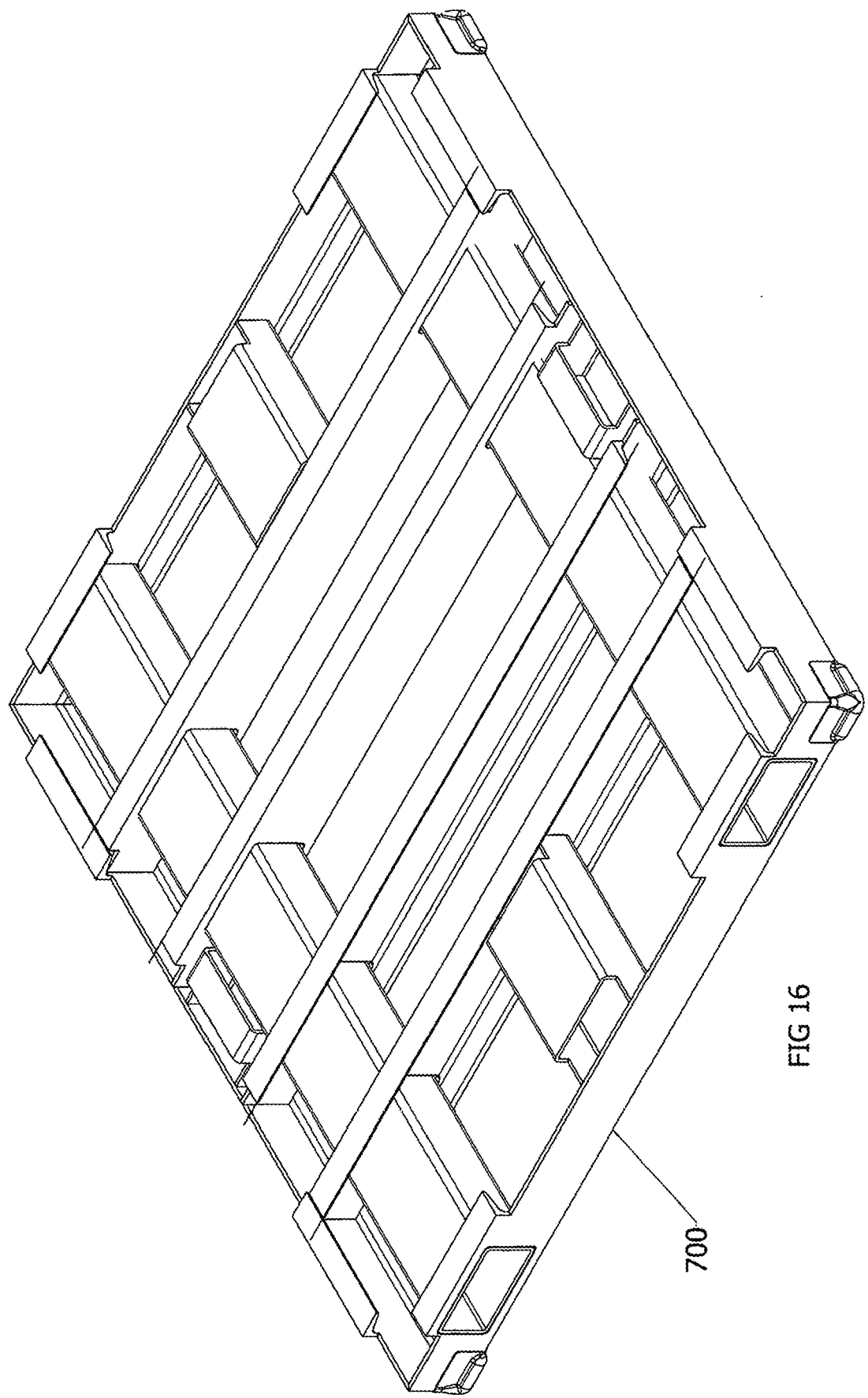
FIG. 16 is a top perspective view of a preferred embodiment of the registration plate.
Figure 17:
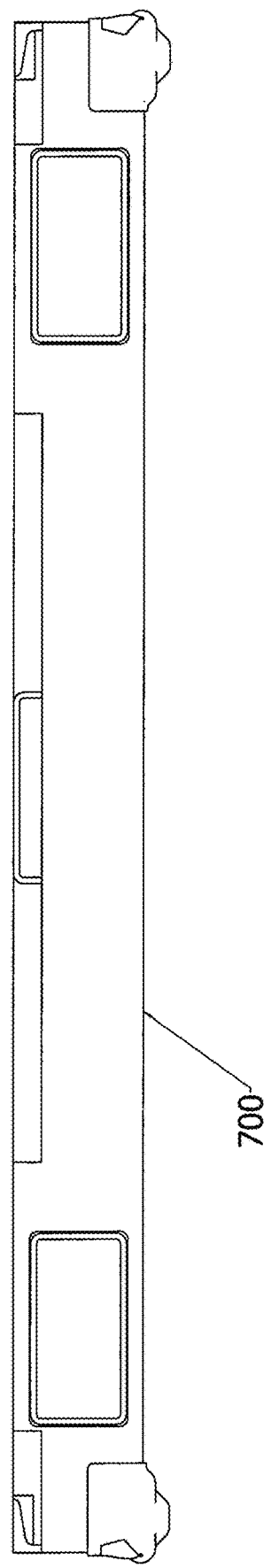
FIG. 17 is a side view of the embodiment in FIG. 16.

The number of units, (n) that can preferably be grouped and interlocked into a 1,200 mm×1,200 mm×1,200 mm cube are described by the formula $n=(1+i)^{(1+i)}$ For (i=2); (n=27), this results in the smallest size shipping container of a preferably 400 mm×400 mm×400 mm cube. A total quantity of (27) of the smallest size shipping container 500 are preferably stacked in a 3 wide×3 deep×3 high configuration and interlocked together into a 1,200 mm×1,200 mm×1,200 mm cube for inter-modal transportation by a combination of a locking registration plates 700 and tie down straps (not shown). Preferably, a plate 700 is placed at the top, bottom and in the middle of the 3×3×3 configuration to hold the containers 500 together and permit the use of tie down straps. This allows for an easier method of moving a large number of containers as a single unit. A preferred embodiment of the registration plate 700 is shown in FIG. 16 in top perspective view. A side view of the plate 700 is shown in FIG. 17.

For (i=1); (n=8), this preferably results in a medium size shipping container such as 600 mm×600 mm×600 mm cube. Preferably, a total quantity of (8) medium size shipping containers can be stacked in a 2 wide×2 deep×2 high configuration and be preferably interlocked together into a, e.g., 1,200 mm×1,200 mm×1,200 mm cube for inter-modal transportation. The registration plates 700 can preferably be used with this configuration as well.

For (i=0), (n=1), this preferably results in a large size shipping container such as a 1,200 mm×1,200 mm×1,200 mm cube. The registration plate 700 shown in FIGS. 16 and 17 can also preferably be used with this configuration.

Preferably, the shipping container 500 comprises a "technology suite" that preferably serves two main functions, bi-directional thermal management and bi-directional pressure control. Thus, the present invention is designed to protect its contents from external thermal and pressure events and to protect exterior objects from thermal or pressure events within its confines.

Figure 11B:
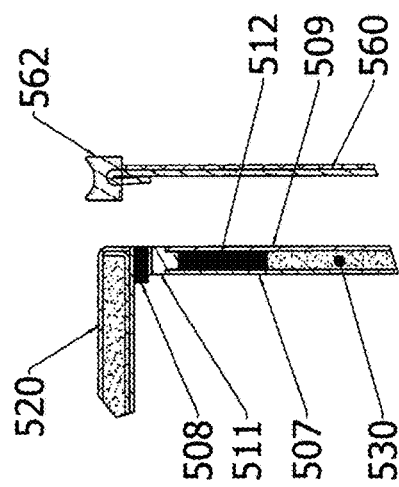
FIG. 11B is close-up cross-section view of the embodiment in FIG. 11A.
Figure 11A:
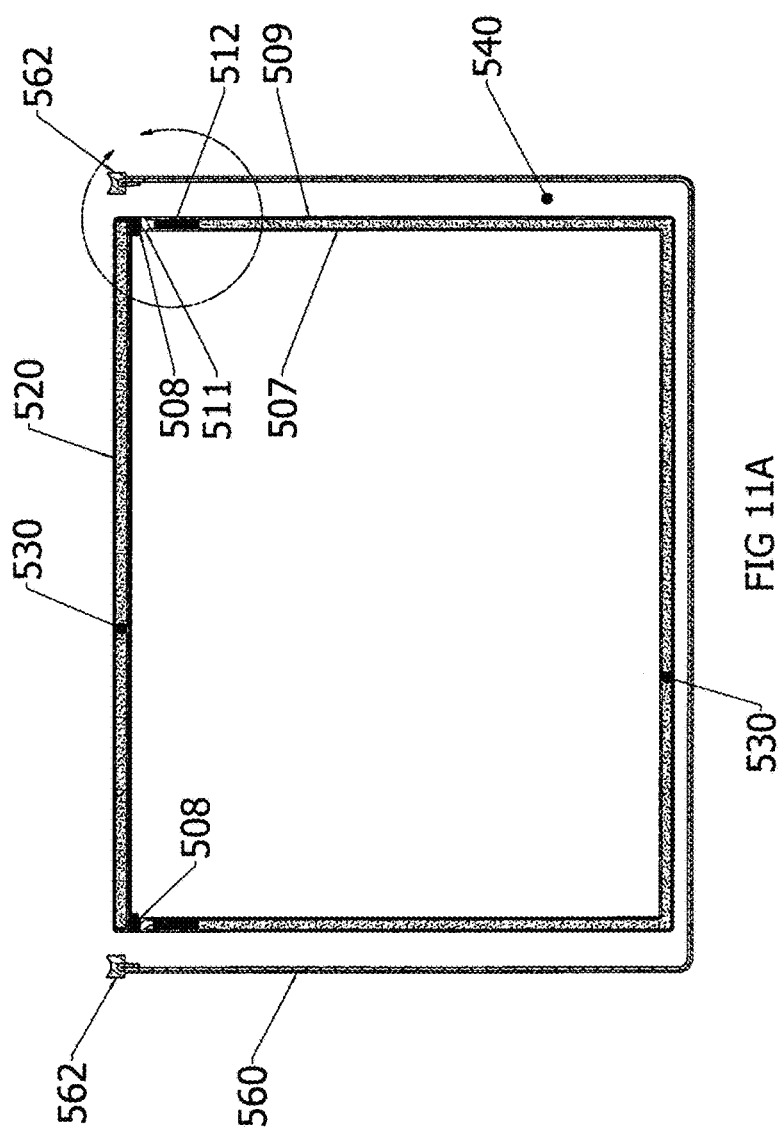
FIG. 11A is side cross-sectional view of an alternative embodiment.
Figure 12C:
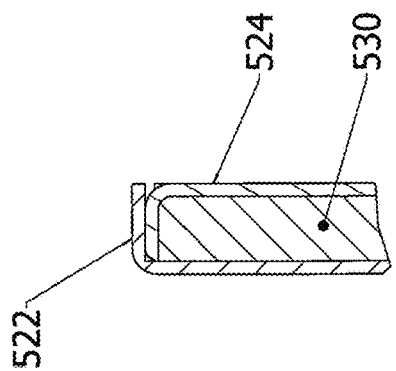
FIG. 12C is a close-up cross-sectional view of the lid assembly.
Figure 12B:
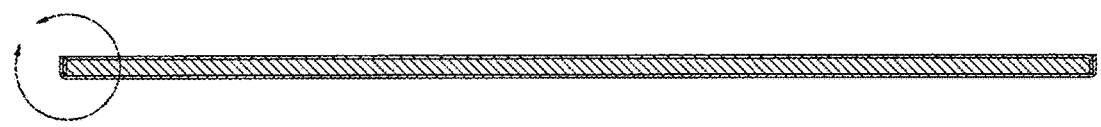
FIG. 12B is a cross-sectional view of the lid assembly.
Figure 12A:
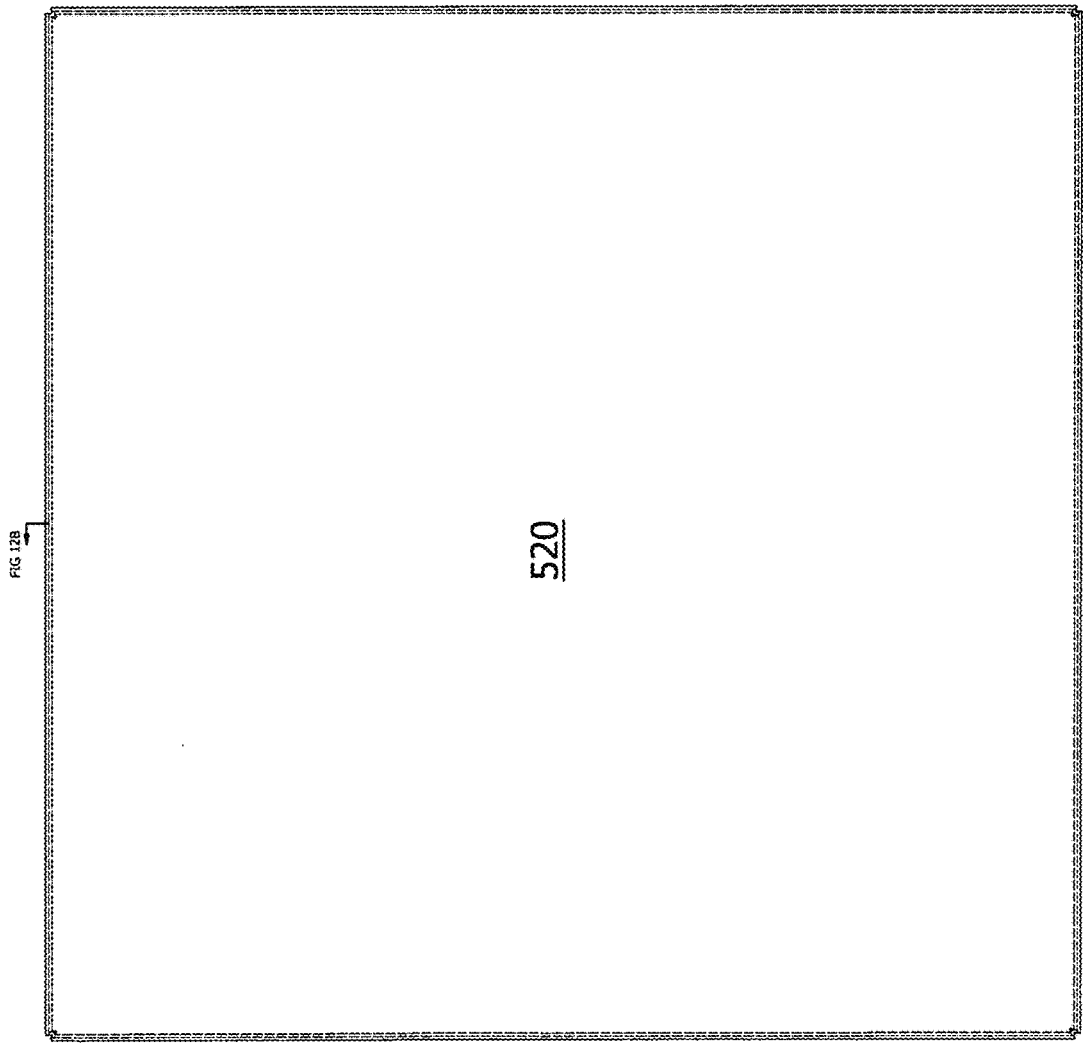
FIG. 12A is a top view of a lid assembly.

Bi-directional thermal management by the present invention is preferably managed as follows. Referring now to FIG. 11, the shipping container 500 preferably utilizes an inner vessel 505 with a first and second wall 507, 509 and a lid assembly 520 [shown in FIG. 12A]. The first and second walls 507 and 509 are preferably thin aluminum. The lid assembly 520 preferably comprises a top lid 522 and a bottom lid 524 filled with a thermal paste 530. See FIG. 12B. The thermal paste 530 preferably exhibits high heat capacity and low thermal conductivity properties. The thermal paste is preferably NOCHAR's P215 brand heat absorbing material.

Figure 13A:
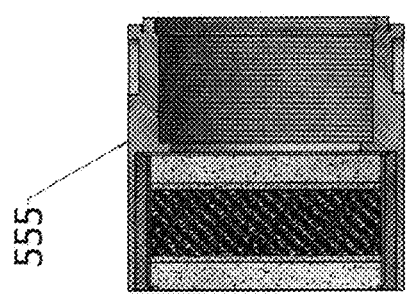
FIG. 13A is a side cross-sectional view of a preferred embodiment of the Flame Arresting/Smoke Particulate Filtration/Chemical Adsorption Unit.

Referring back to FIG. 11, the inner vessel 505 is sealed to the lid assembly 520 with a high temperature non-woven pin punched felt gasket 508 and preferably sealed from the outside by two Pressure Relief Valve/Flame Arresting/Smoke Particulate Filtration/Chemical Adsorption Unit (FA/SPF/CAU) Assemblies 555 shown in FIGS. 13A and B.

Accordingly, when a thermal event within the sealed inner vessel 505 occurs, e.g. heat generated by a single or multiple cascading Li-Ion Battery Thermal Runaway Event, the heat is rapidly transferred by conduction, convection and radiation from the sealed inner vessel 505 via rapid conduction into the thin aluminum inner walls of these assemblies 507, 509 and into the thermal paste 530 and is slowed from transferring outside of the shipping container 500. More-over, heated gases from the sealed inner vessel 505 are preferably vented through the two assemblies 555 to the exterior of the shipping container.

Furthermore, when a thermal event outside the shipping container 500 occurs, heat is preferably slowed from transferring to the outer walls of the inner vessel 505 and top lid assemblies 520 by three barriers, a (1) cargo container exterior wall 560 with an (2) aluminum oxide coating and (3) an air gap 540. Preferably, heat within the air gap 540 is slowed from transferring to the inner vessel 505 by the walls of the assemblies 507, 509 and the thermal paste 530.

Bi-directional pressure control is preferably managed as follows. Referring now to FIG. 14, a high temperature seal 512 is located between the walls 507, 509 of the inner vessel 505 and below the lid assembly 520. Also, preferably, a hermetic seal 562, e.g. a DuPont brand Kalrez™ perfluoroelastomer O-ring, is located at the top of the cargo container 560 and below the cargo container lid 564. Furthermore, the shipping container comprises, preferably two assemblies 550, for pressure control.

Figure 13B:
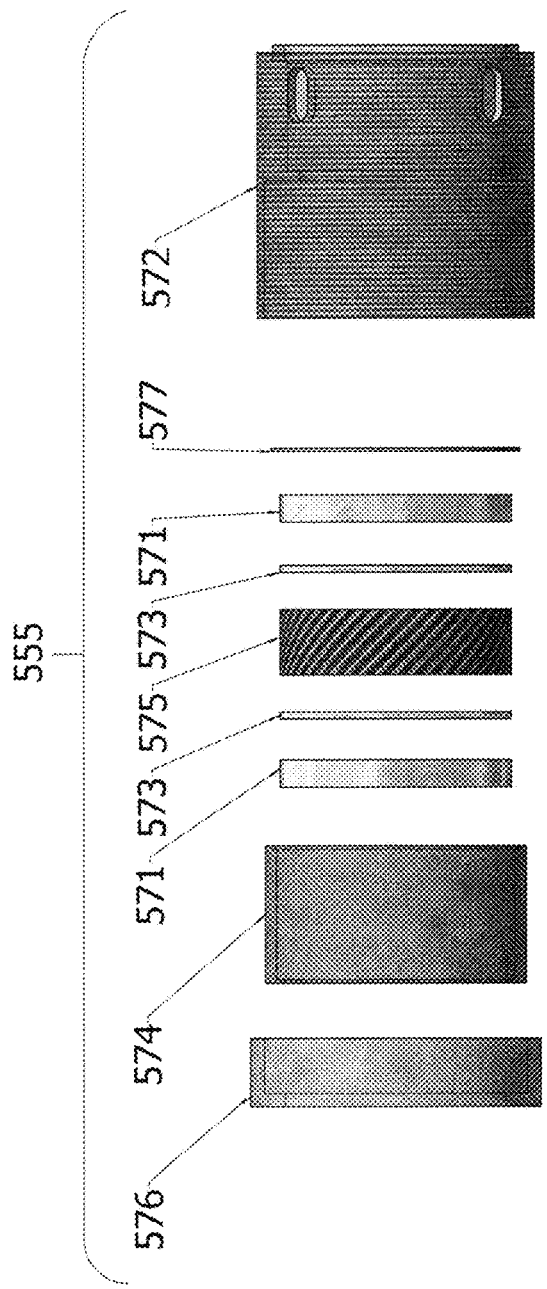
FIG. 13B is an exploded side view of the embodiment in FIG. 13A.

Referring now to FIG. 14, an assembly 550 preferably comprises a bi-directional breather valve 552 and a Flame Arresting/Smoke Particulate Filtration/Chemical Adsorption Unit Assembly (FA/SPF/CAU) 555 traversing the walls 507, 509 of the inner vessel 505 and the cargo container 560. FIG. 13A shows a preferred embodiment of the FA/SPF/CAU assembly 555 and FIG. 13B shows an exploded view of FA/SPF/CAU assembly 555. Referring back to FIG. 14, the bi-directional breather valve 552 is preferably threaded into the filter housing 572 of FA/SPF/CAU assembly 555. The filter housing 572 preferably holds a filter sleeve 574 held onto the housing 572 by a threaded nut 576. The filter sleeve 574 preferably contains the following layered filtering components: open cell aluminum foam 571, high temperature non-woven felt 573, gas absorption media 575, high temperature non-woven felt 573, open cell aluminum foam 571 and aluminum wire mesh 577. The gas absorption media 575 preferably comprises randomly packed molecular sieves type 3A, 4A, 5A and 13X and 2 mm palladium-plated catalyst microspheres. These molecular sieves are disclosed in paragraph 181.

For air transport, during ascent, pressure in an aircraft cargo hold generally decreases from a higher value at takeoff to a lower value at cruising altitude. During ascent, the breather valve 552 preferably opens towards (or in the direction) of the exterior of the shipping container 500 unsealing the breather valve internal o-ring (not shown) and allowing airflow from the higher pressure region in the inner cavity of the inner vessel to the exterior of the shipping container 500. In general, during ascent, air from the interior is released when the interior pressure of the container 500 exceeds the unsealing (crack) set-point value in the unsealing set-point range between (0.5 to 1.0 psig); and until the differential pressure between the interior of the container 500 and the exterior of the container 500 drops below the sealing set-point (0.5 psig). The valve 552 then reseals against the breather valve internal o-ring.

During descent, pressure in an aircraft cargo hold generally increases from a lower value at cruising to a higher value at touchdown. Accordingly, during descent, the valve 552 opens towards (in the direction) of the interior vessel 505 unsealing the sealing breather valve internal o-ring (not shown) of the valve 552 allowing airflow from the high pressure region exterior to the container 500 into the interior of the inner vessel 505 until the pressure equalizes, at which point the valve 552 seals.

Referring now to FIG. 19, one Uni-Direction Magnetic Breather Valve (V2) 553 (Prior Art US 20150323088 A1) and a Flame Arresting/Smoke Particulate Filtration/Chemical Adsorption Unit Assembly (FA/SPF/CAU) 555 is fitted between the shipping container outer wall and the sealed inner vessel inner wall.

The bi-directional pressure management thus preferably operates as follows. The container 500 allows gases from an energetic event such as thermal runaway to accumulate in the inner cavity box until the pressure exceeds P1, P2, P3, P4 or P5 where P1<P2<P3<P4<P5

Where P1—pressure set-point valve V1<0.5 psia
Where P2—pressure set-point valve V2>0.5 psia
Where P3—pressure bypass of the head flange gasket>1.0 psia These pressures (P1, P2 and P3) allow gases to accumulate in the air GAP between the inner cavity box and the inner wall of the exterior shipping box until the pressure exceeds pressure P4—pressure set-point valve V3>1.2 psia ALLOW gases that have bypassed the head flange gasket to bypass the exterior shipping box hermetic seal if the pressure exceeds pressure P5—bypass pressure hermetic seal>2 psia
ADD TWO Pressure relief valves (V1) 552 [FIG. 14] & V2 553 [FIG. 19] to operate at set-points (P1 & P2) to allow pressure to be relieved from the inner cavity to the exterior of the shipping container.
CONNECT pressure relief valves V1 and V2 to the outside of the shipping container via an internally and externally threaded connector 578 [FIG. 19] via a Flame Arresting/Smoke Particulate Filter/Chemical Adsorption Unit (FA/SPF/CAU) 555.
DIRECTLY vent gases outside of the shipping container when the internal pressure in the inner cavity exceeds P1 or P2.
ESTABLISH a sealed pathway from the inner cavity to the exterior of the shipping box such that the gases generated from thermal runaway or pressure variation caused by a change in altitude or temperature variation are vented to the exterior when the internal pressure in the inner cavity box exceeds P1 or P2.
Valve (V1) is a LOW FLOW standard spring type bi-directional valve allowing pressure equalization between the exterior and the inner cavity of the shipping container during differential pressurization changes (vents from inside to the outside during ascent and from ambient to inside during descent in the cargo area of the plane.
Valve (V2) is a quick opening HIGH FLOW neodymium magnet type uni-directional breather valve allowing gases to be vented from the inner cavity to the outside of the exterior shipping box.
SEAL the inner cavity box to the inner cavity lid by a head flange 511 [FIG. 11B] and non-woven high temperature needle punched felt head flange gasket 508 [FIG. 18].
PROVIDE a non-woven high temperature needle punch felt head gasket with the following characteristics:
    Functions as an overpressure fail-safe in addition to V1 and V2.
    Filters particulate smoke.
    Located between the inner cavity and the exterior shipping box hermetic seal.
    ALLOW gases from the inner cavity to flow from the inner cavity into the airgap when pressure exceeds P3
    PREVENT gases bypassed through the head flange gasket from being DIRECTLY vented to ambient atmosphere.
    BYPASS through a CHANNEL into the AIR GAP between the inner cavity box and the exterior shipping container.

ADD a bi-directional spring actuated type pressure relief valve (V3) 554 (FIG. 15) to allow gases to be vented from the AIR GAP to the exterior of the shipping container.

Valve (V3) 554 is a standard spring type bi-directional valve allowing pressure equalization between the outside of the shipping box and the during differential pressurization changes. V3 vents from the airgap 540 to the exterior of the shipping box during ascent and from exterior to the air gap during descent.

PREVENTS gases bypassed through the head flange gasket 508 from being DIRECTLY vented to the exterior of the shipping container.

OPEN V3 554 to vent gases to the outside of the shipping container whenever the pressure in the air gap exceeds P4.

Pressure Management:
1) During a lithium ion battery or cell thermal runaway event within the inner cavity of the shipping container, hot gases from the by-products of electrolyte gel or salt decomposition burn causing the inner packaging materials and additional batteries or cells to burn. If the conditions are optimum an explosion occurs. The combustion and resulting explosion causes a gradual increase in pressure followed by a substantial pressure pulse.
   a) PRESSURE MANAGEMENT THROUGH COMBUSTION CONTROL
      i) PRIOR TO COMBUSTION
         (1) REMOVE FUEL
            (a) Reduce the volume of combustible gases available for combustion
         (2) REMOVE $O_2$
            (a) Reduce the amount of $O_2$ to support combustion
         (3) REMOVE HEAT
            (a) Cool the reacting gases by removing the heat of reaction through thermal panels filled with thermal paste
            (b) Remove hot gases from the sealed inner cavity by expelling them to the outside
      ii) DURING COMBUSTION
         (1) REMOVE FUEL
            (a) Reduce the volume of combustible gases from combustion
         (2) REMOVE $O_2$
            (a) Reduce the volume of $O_2$ to support combustion
         (3) REMOVE HEAT
            (a) Cool the heated reacting and un-reacted combustible and non-combustible gases by interacting with the thermal paste filled inner cavity inner walls
            (b) Expel reacted and unreacted combustible and non-combustible gases from the inner cavity to the exterior of the shipping container
   b) PRESSURE MANAGEMENT DURING EXPLOSION
      i) REDUCE AMPLITUDE OF PRESSURE PULSE
         (1) Reduce maximum amplitude of the pressure pulse outside the shipping container by relieving pressure build up in the inner cavity in stages when it exceeds threshold values.
            (a) Stage One. When the pressure in the inner cavity increases to set-point P1, exhaust gases at a low flow rate to outside the shipping container through V1 and its attached FASPFCAU.
               (i) P1<0.5 psia
            (b) Stage Two. When the pressure in the inner cavity increases to set-point P2, exhaust gases at a high flow rate to outside the shipping container through V2 and its attached FASPFCAU.
               (i) P2>0.5 psia
            (c) Stage Three. When the pressure in the inner cavity increase to set-point P3, exhaust gases to the airgap through the head gasket 508.
               (i) P3>1.0 psia
            (d) Stage Four. When the pressure in the airgap increases to set-point P4, exhaust the gases to outside the shipping container through V3.
               (i) P4>1.2 psia
            (e) Stage Five. When the pressure in the inner cavity increases to set-point P5, exhaust gases to outside the shipping container bypassing the hermetic seal 562.
               (i) P5>2.0 psia
         (f) Convert the high amplitude pressure wave created by an explosion in the inner cavity to lower frequency lower amplitude pressure wave propagated to the exterior of the shipping container
            (i) Reflect the initial pressure pulse off the inner walls of the inner cavity.
            (ii) Absorb the kinetic energy of the pressure pulse by flexing and deforming the inner vessel and top lid assemblies into the surrounding air gap.
            (iii) Transfer kinetic energy of the pressure pulse to heat energy in the thermal paste within the inner vessel and top lid assemblies.
            (iv) Create a pressure drop across the (V1 or V2) FA/SPF/CAU Assembly 555.

This embodiment of the present invention preferably further provides the following during an energetic event: flame arrestment, smoke particulate filtration, and chemical adsorption.

For flame arrestment, flames produced by the auto ignition of gel electrolyte and supported by $O_2$ outside of a lithium ion battery or cell are preferably arrested by the FA/SPF/CAU Assembly 555. Preferably, burning gas/air mixture are expelled to the outside of the shipping container 500 via the pressure management system described above. The container 500 arrests flame preferably by absorbing heat from a flame front traveling at sub-sonic velocities through the components of the FA/SPF/CAU Assembly 555 as described above. When the heat of the burning gas/air mixture falls below its auto-ignition temperature, the flame is extinguished. Heat from the flame is absorbed through tightly spaced passages in the aluminum wire mesh screen 577, open cell aluminum foam disk bodies 571, pin punched non-woven felt 573 and the randomly packed molecular sieves 575 grouped within the aluminum filter sleeve 574 of the FA/SPF/CAU Assembly 555.

Figure 18:
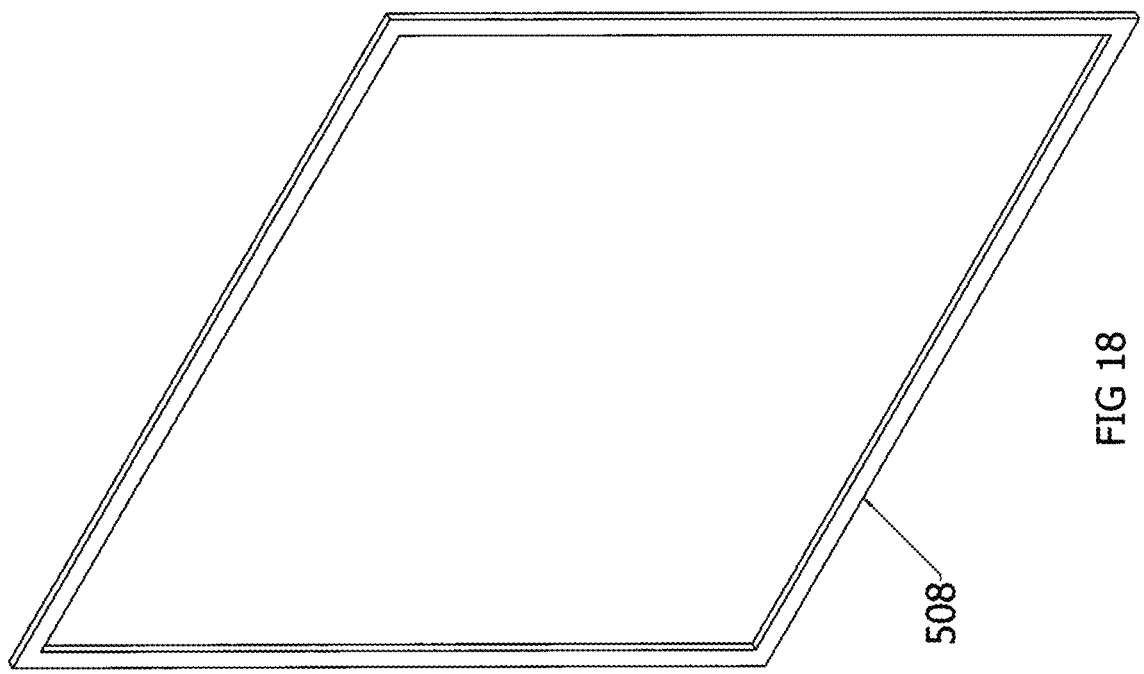
FIG. 18 is a front perspective view of a non-woven felt gasket.

For smoke particulate filtration, the FASPFCAU 555 filters particulates preferably with high temperature pin punched non-woven felt disks 573 and head gasket 508. A preferred embodiment of head gasket 508 is also shown in FIG. 18. The disks 573 and gasket 508 preferably have filtration properties that selectively trap large smoke particles during the combustion of lithium ion batteries and cells and their protective packaging. In addition, the smoke particulate filter disks 573 and gasket 508 characteristically exhibit low differential pressure drops at high flow rates.

Hazardous combustible and non-combustible gases are evolved during the electrolyte decomposition, combustion and explosion of lithium ion batteries and cells include, but are not limited to, carbon dioxide, hydrogen, carbon monoxide, methane, propylene, ethylene, butane, ethane, butene, propane, acetaldehyde, formaldehyde, hydrogen fluoride and hydrogen chloride.

The Chemical Adsorption Unit subsection of the FASPFCAU 555 preferably contains gas adsorption media 575. The gas adsorption media 575 is preferably a blend of molecular sieves whose specific ratio is chosen to selectively adsorb $O_2$ and $H_2O$ during normal shipment conditions and absorb the combustible and non-combustible gases evolved during electrolyte decomposition, combustion and explosion of lithium ion batteries and cells and their protective packaging.

The gas-absorption media/molecular sieves 575 used are preferably 4 to 8 mesh type 3A, 4A, 5A and 13X. Composition of these types are preferably as follows: Type 3A is 0.6 $K_2O$: 0.40 $Na_2O$: 1 $Al_2O_3$: 2.0±0.1$SiO_2$: x $H_2O$ excludes molecules >3 Å; Type 4A is 1 $Na_2O$: 1 $Al_2O_3$: 2.0±0.1 $SiO_2$: x $H_2O$ and excludes molecules >4 Å; Type 5A is 0.80 CaO: 0.20 $Na_2O$: 1 $Al_2O_3$: 2.0±0.1 $SiO_2$: x $H_2O$ and excludes molecules >5 Å; and, Type 13X is 1 $Na_2O$: 1 $Al_2O_3$: 2.8±0.2 $SiO_2$: $xH_2O$ and excludes molecules >10 Å. The molecular sieves 575 also preferably include 2 mm palladium-coated microsphere catalyst.

Thus, an improved shipping container for lithium-ion batteries is described above. In each of the above embodiments, the different positions and structures of the present invention are described separately in each of the embodiments. However, it is the full intention of the inventors of the present invention that the separate aspects of each embodiment described herein may be combined with the other embodiments described herein. Those skilled in the art will appreciate that adaptations and modifications of the just-described preferred embodiment can be configured without departing from the scope and spirit of the invention. Therefore, it is to be understood that, within the scope of the appended claims, the invention may be practiced other than as specifically described herein.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A shipping container configured for shipping thermally active materials, the shipping container comprising:
    an outer vessel;
    an inner vessel with a first and second wall and a lid assembly, where the lid assembly comprises a top lid and a bottom lid and a superabsorbent polymer-based thermal flame retardant paste for preventing the spread of fires with temperatures exceeding 824° F.; and,
    where the first and second walls comprise at least two relief valves.

2. The shipping container of claim 1 where there is an air gap between the inner vessel and outer vessel.

3. The shipping container of claim 1 further comprising a felt gasket positioned between the lid assembly and the first and second walls.

4. The shipping container of claim 1 where at least one relief valve is a flame arresting/smoke particulate filtration/chemical adsorption unit assembly.

5. The shipping container of claim 1 further comprising a pallet base attached to the outside vessel.

6. The shipping container of claim 1 where at least one relief valve is bi-directional.

7. The shipping container of claim 1 where the outer vessel further comprises an o-ring.

8. A plurality of shipping containers and at least one registration plate, each shipping container comprising:
    an outer vessel;
    an inner vessel with a first and second wall and a lid assembly, where the lid assembly comprises a top lid and a bottom lid and a superabsorbent polymer-based flame retardant thermal paste for preventing the spread of fires with temperatures exceeding 824° F.; and,
    where the first and second walls comprise at least two relief valves;
    where the plurality of shipping containers are stacked on at least one registration plate, where the at least one registration plate interlocks with the plurality of shipping containers.

9. A shipping container configured for shipping thermally active materials, the shipping container comprising:
    a plurality of structural panels defining a container interior configured for receiving thermally active materials, and an exterior disposed adjacent to an environment in which the shipping container is placed,
    a thermal barrier member for placement between the thermally active materials and the environment in which a container is placed, the thermal barrier member including a thermal barrier interior panel and a thermal barrier exterior panel, where the thermal barrier interior panel and the thermal barrier exterior panel define a heat absorbing material receiving cavity;
    a flowable polymer based flame-retardant material for resisting temperatures exceeding 824° F. disposed within the heat absorbing material receiving cavity, wherein the thermal barrier member is configured to substantially surround the thermally active materials to prevent temperatures exceeding 824° F. from the thermally active materials heating the environment in which the shipping container is disposed to 824° F. or above; and,
    at least one pressure relief member for permitting pressure generated by the thermally active materials to be vented to atmosphere.

10. The shipping container of claim 9 where the at least one pressure relief member comprises a flame arresting/smoke particulate filtration/chemical adsorption unit assembly.

* * * * *